United States Patent [19]
Swann et al.

[11] Patent Number: 5,106,119
[45] Date of Patent: Apr. 21, 1992

[54] INFLATOR HOUSING

[75] Inventors: Timothy A. Swann; John P. O'Loughlin, both of Mesa, Ariz.

[73] Assignee: TRW Inc., Lyndhurst, Ohio

[21] Appl. No.: 629,599

[22] Filed: Dec. 18, 1990

[51] Int. Cl.⁵ .............................................. B60R 21/16
[52] U.S. Cl. ..................................... 280/731; 280/736; 280/741; 280/742
[58] Field of Search ............... 280/740, 741, 742, 743, 280/728, 730, 731, 736

[56] References Cited

U.S. PATENT DOCUMENTS

| | | | |
|---|---|---|---|
| 3,985,076 | 10/1976 | Schneiter et al. | 280/741 |
| 4,278,638 | 4/1981 | Nilsson et al. | 280/731 |
| 4,296,084 | 10/1981 | Adams et al. | 280/731 |
| 4,380,346 | 4/1983 | Davis et al. | 280/736 |
| 4,530,516 | 7/1985 | Adams et al. | 280/741 |
| 4,561,675 | 12/1985 | Adams et al. | 280/736 |
| 4,902,036 | 2/1990 | Zander et al. | 280/736 |
| 4,907,819 | 3/1990 | Cuevas | 280/743 |
| 5,004,586 | 4/1991 | Hayashi et al. | 280/741 |

FOREIGN PATENT DOCUMENTS 2022194 9/1982 United Kingdom ................ 280/742

*Primary Examiner*—Kenneth R. Rice
*Attorney, Agent, or Firm*—Tarolli, Sundheim & Covell

[57] ABSTRACT

An apparatus for inflating a vehicle occupant restraint includes an inflator housing which holds gas generating material. The inflator housing includes a combustion cup which is formed from one piece of sheet metal. A diffuser cup, which is also formed from one piece of sheet metal, encloses the combustion cup. A chamber in the combustion cup holds the gas generating material and is closed by a cover. Flanges on the combustion cup, diffuser cup and cover are disposed in overlapping engagement with each other. During formation of the combustion and diffuser cups, the sheet metal is strained hardened to increase the yield strength and ultimate tensile strength of portions of the inflator housing.

46 Claims, 9 Drawing Sheets

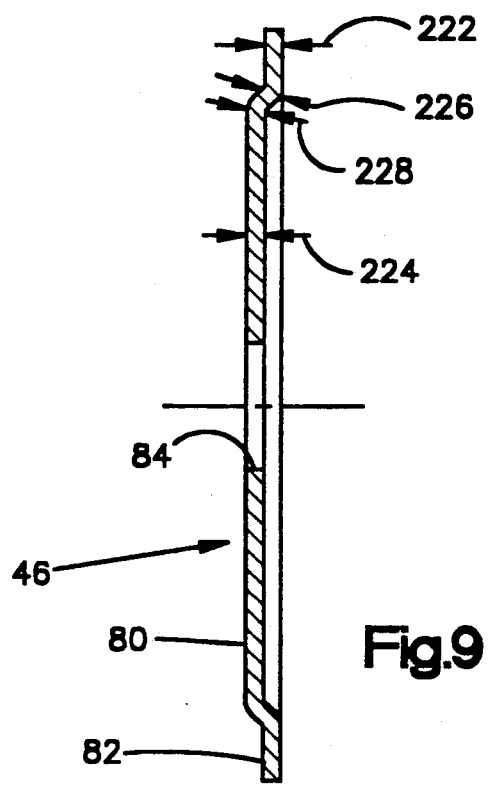
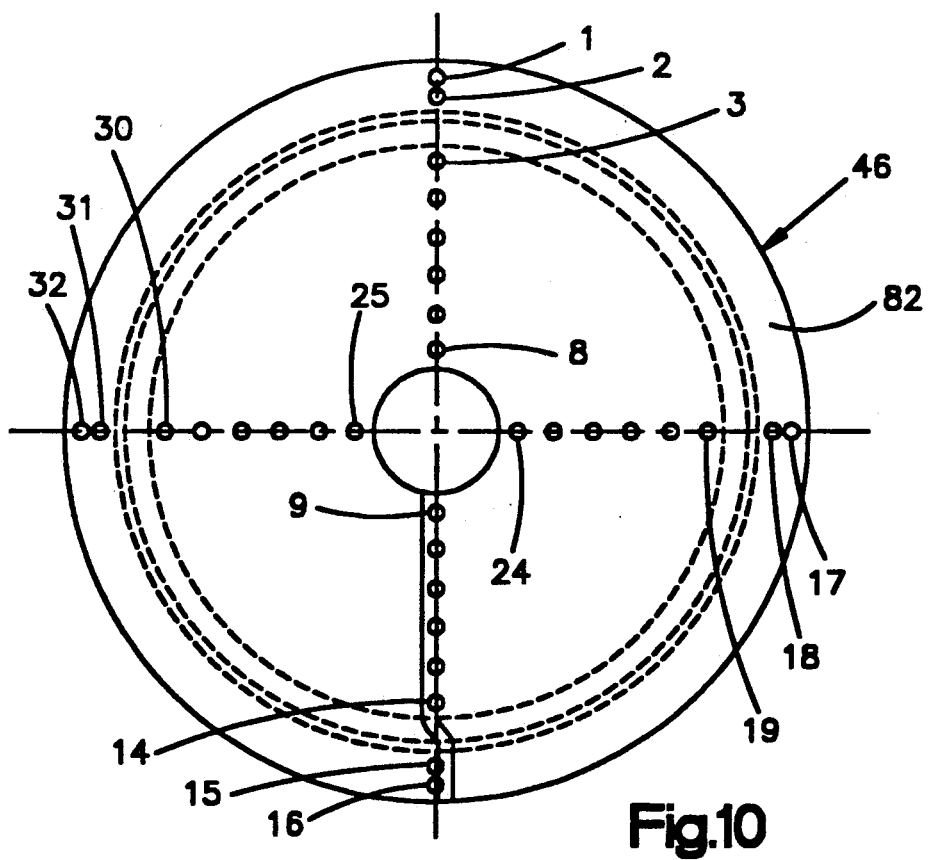

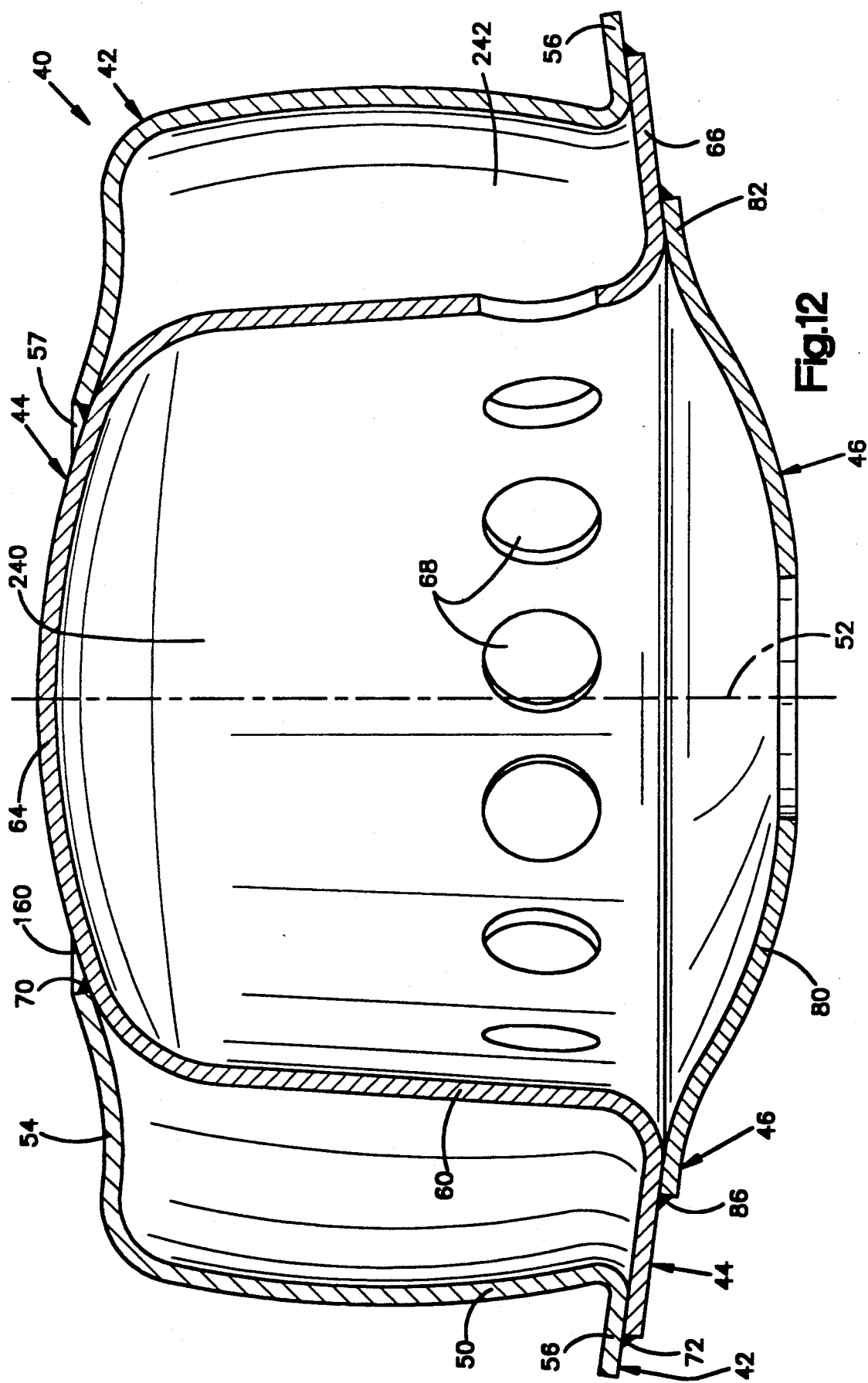

INFLATOR HOUSING

BACKGROUND OF THE INVENTION

The present invention relates to a new and improved apparatus and method for inflating a vehicle occupant restraint. Specifically, the invention relates to an air bag inflator housing which holds material for generating gas to inflate the air bag.

A known inflator housing which holds material for generating gas to inflate an air bag is disclosed in U.S. Pat. No. 4,902,036. This known inflator housing includes a base and a diffuser which are formed of stainless steel. The base and diffuser are joined at mounting flanges to define a chamber for gas generating material. The base and diffuser are also interconnected by a center post and a plurality of rivets which extend through the base and diffuser at locations between the center post and the mounting flanges.

Although this known inflator housing is generally satisfactory, the inflator housing could be improved by reducing its weight without significantly impairing the ability of the inflator housing to withstand relatively high gas pressures. In addition, it is desirable to minimize the cost of the components of the inflator housing and to improve the ease with which the inflator housing is assembled.

SUMMARY OF THE INVENTION

The present invention provides an improved housing for an inflator which inflates a vehicle occupant restraint such as an airbag. The inflator housing has a chamber in which gas generating material is located. The gas generating material, when ignited, provides gas to inflate the occupant restraint. The inflator housing includes a combustion cup formed from a single piece of sheet metal. The combustion cup is enclosed by a diffuser cup which is also formed from a single piece of sheet metal. A cover closes a chamber in the combustion cup in which the gas generating material is located.

The one-piece combustion cup has an axially extending side wall which also extends around the gas generating material. An end wall of the combustion cup is imperforate and extends inwardly from the side wall at least partially to close one end of the combustion cup. At an end of the combustion cup opposite from the end wall, a flange extends outwardly from the side wall.

The one-piece diffuser cup has an axially extending side wall which is spaced from and extends around the side wall of the combustion cup. An end wall of the diffuser cup extends inwardly from one end of the diffuser cup side wall into overlapping engagement with the end wall of the combustion cup. To minimize weight, an opening is formed in the end wall of the diffuser cup.

A flange extends radially outwardly from the diffuser cup side wall. The diffuser cup flange is disposed in an overlapping relationship with the flange on the combustion cup. The cover which closes the combustion cup chamber is also disposed in an overlapping relationship with the flange on the combustion cup.

The side walls of the combustion cup and diffuser cup are strengthened by strain hardening of the side walls during formation of the combustion and diffuser cups. Due to the strain hardening, the side wall of the combustion cup has a yield strength which is greater than the yield strength of the end wall of the combustion cup. Similarly, the diffuser cup has a side wall with a yield strength which is greater than the yield strength of the end wall of the diffuser cup.

When the gas generating material in the combustion cup deflagrates to provide gas to inflate the air bag, the combustion cup, the cover, and the diffuser cup are exposed to gas at high pressures. The combustion cup end wall and the cover of the inflator housing are plastically deformed to a relatively large extent by the gas pressure. However, there is minimal plastic deformation of the side wall of the combustion cup. This is due to the high yield strength of the side wall of the combustion cup and to structural reinforcing which results from the cooperation between the combustion cup, diffuser cup, and cover.

BRIEF DESCRIPTION OF THE DRAWINGS

The foregoing and other features of the invention will become more apparent upon a consideration of the following description taken in connection with the accompanying drawings wherein:

FIG. 9 is a schematic illustration of still another part of the housing shown in FIG. 3;

FIG. 10 is another schematic illustration of the part of the housing shown in FIG. 9;

FIG. 12 is a schematic sectional view illustrating the manner in which the housing of FIG. 3 is deformed by fluid pressure during a housing strength test.

DESCRIPTION OF ONE EMBODIMENT OF THE INVENTION

General Description

Figure 1:
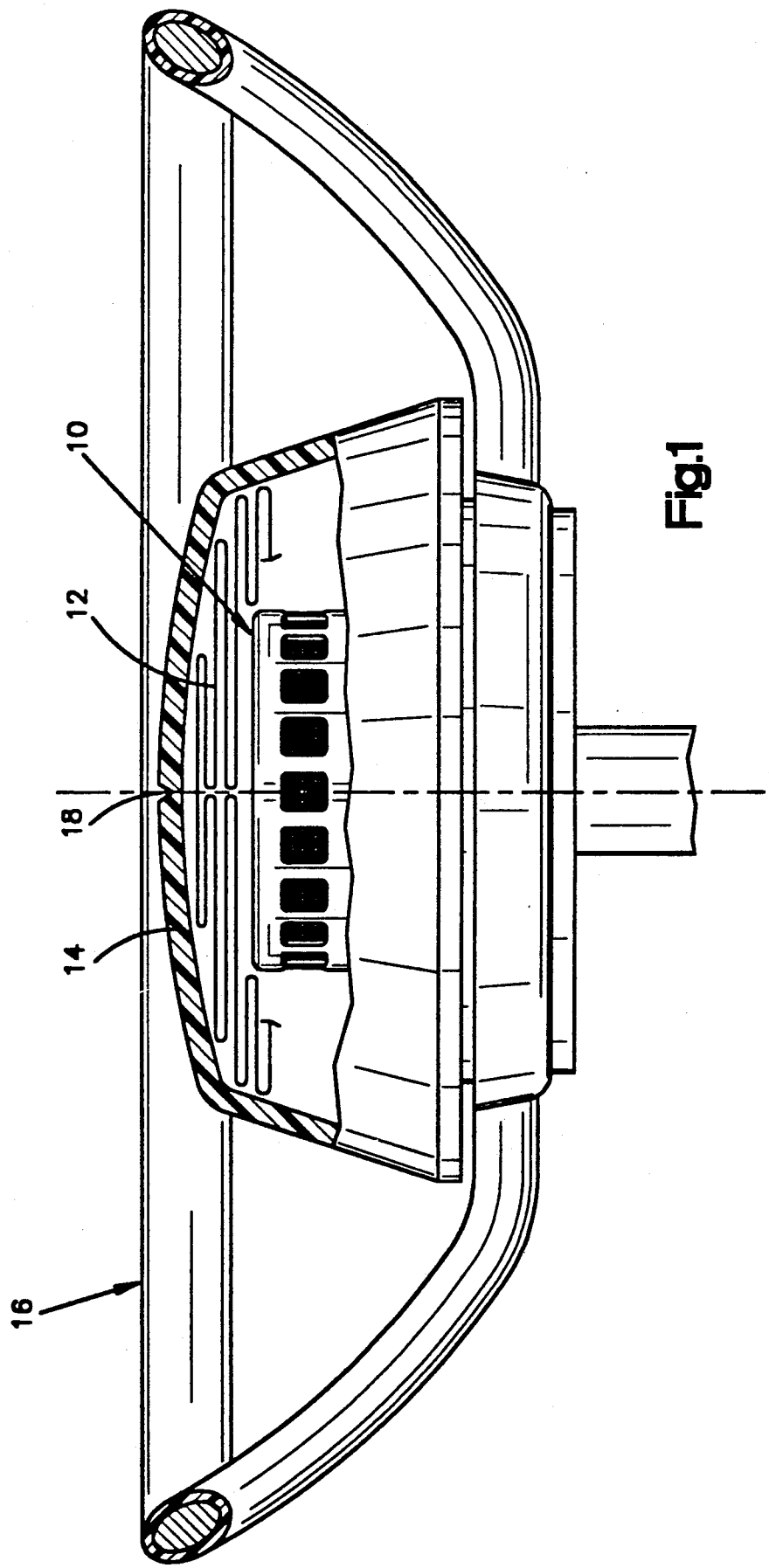
FIG. 1 is a fragmentary sectional view of a safety apparatus, constructed in accordance with the present invention, mounted on a steering wheel of a vehicle.

The present invention relates to an air bag inflator and particularly to an inflator for inflating an air bag to protect the driver of a vehicle. The present invention is applicable to various inflator constructions. As representative of the present invention, FIG. 1 illustrates an inflator 10. An air bag 12 is folded around the inflator 10. A cover 14 encloses the air bag 12 and the inflator 10. The inflator 10, the air bag 12, and the cover 14 are components of a module which is mounted on a vehicle steering wheel 16.

Upon the occurrence of sudden vehicle deceleration, such as occurs in a collision, the inflator 10 is energized and produces a large volume of gas. The gas from the inflator 10 expands the air bag 12. As the air bag 12 starts to expand, it breaks weakened portions in the cover 14. One of the weakened portions is designated 18 in FIG. 1. As the air bag 12 continues to expand, it moves into the space between the driver of the vehicle and the steering wheel 16 to restrain movement of the driver, as is known.

The inflator 10 (FIG. 2) includes a housing 40. The housing 40 is made of three pieces, namely a one-piece diffuser cup 42, a one-piece combustion cup 44, and a one-piece combustion chamber cover 46 (FIGS. 3 and 4). The diffuser cup 42, the combustion cup 44, and the combustion chamber cover 46 are each made from one-piece of sheet metal, such as UNS S30100 stainless steel.

The diffuser cup 42 is generally cup-shaped, is a single piece of sheet metal, and has a cylindrical side wall 50 extending around the central axis 52 of the inflator 10. The side wall 50 extends between a flat upper annular end wall 54 and a flat lower annular flange 56. The annular flange 56 extends radially outwardly from an end of the diffuser cup opposite from the end wall 54 and is coaxial with the side wall 50. A circular inner annular surface 55 on the upper end wall 54 of the diffuser cup 42 defines a central circular opening 57 in the upper end wall 54 which minimizes the weight of the diffuser cup. The end wall 54 and the flange 56 are parallel to each other and perpendicular to the axis 52. An annular array of gas outlet openings 58 extends circumferentially around an upper portion of the diffuser cup side wall 50.

Figure 2:
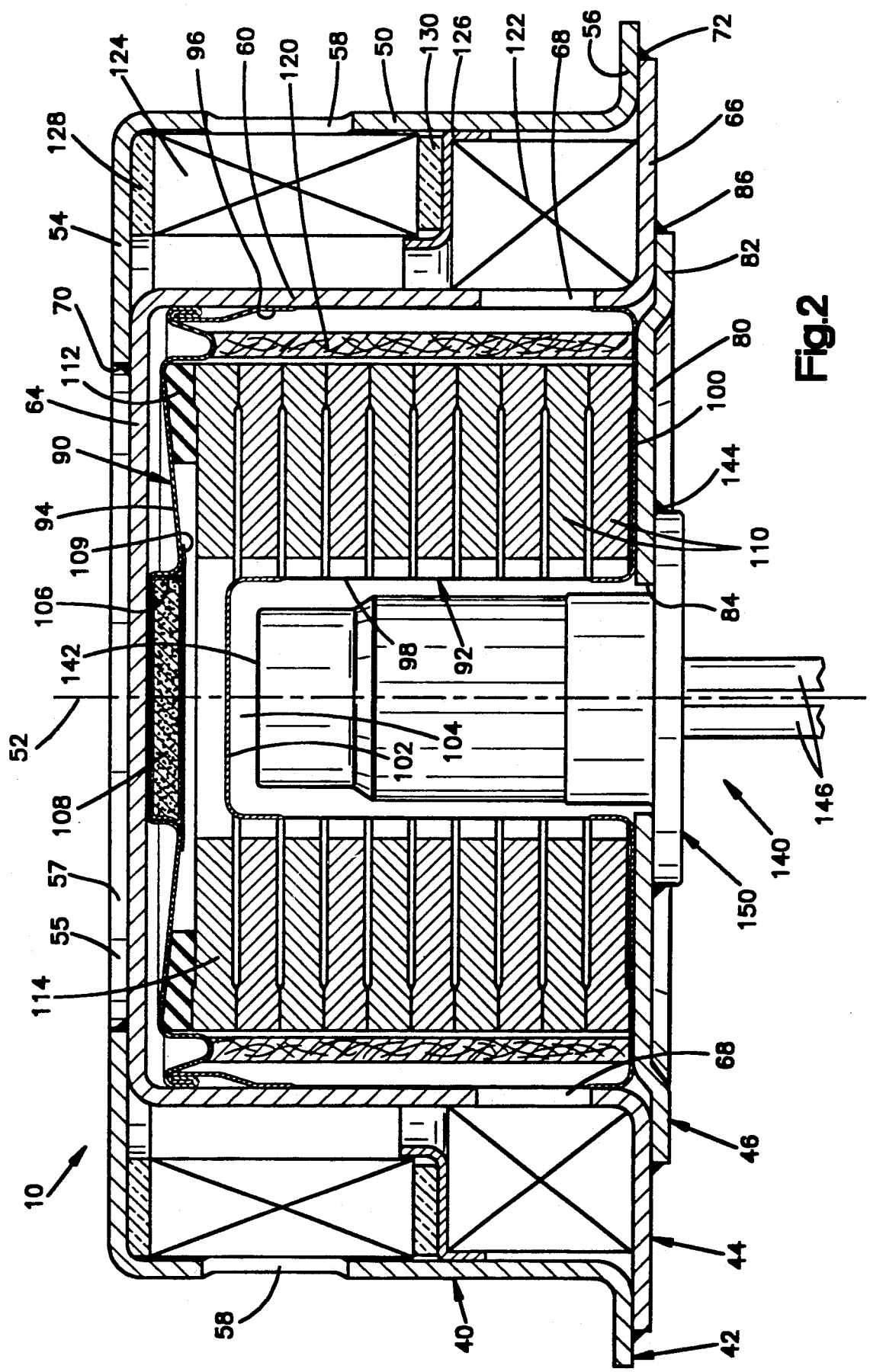
FIG. 2 is an enlarged sectional view illustrating the construction of an inflator used in the safety apparatus of FIG. 1.
Figure 3:
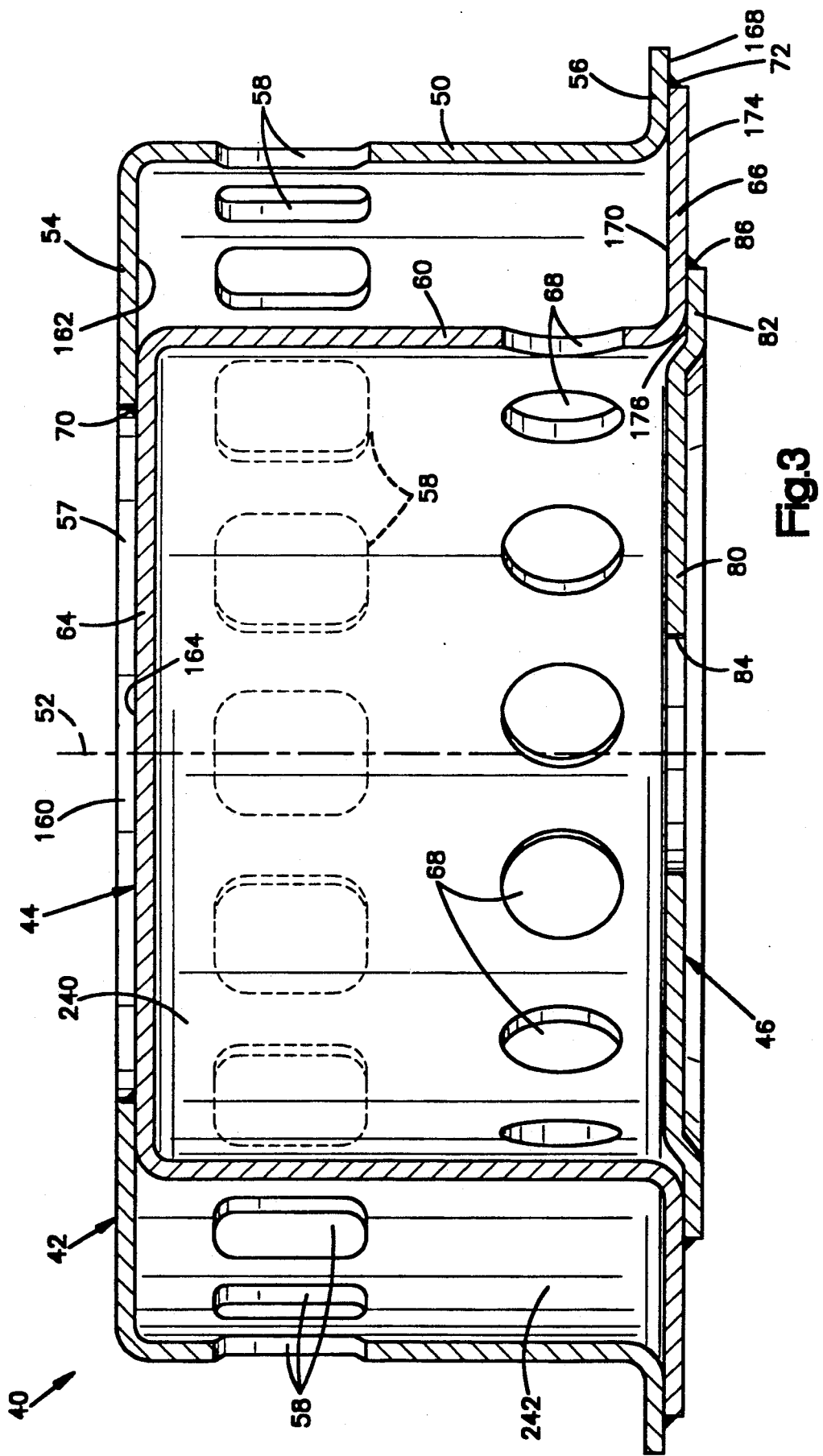
FIG. 3 is a sectional view of a housing used in the inflator of FIG. 2, other components of the inflator having been removed from the housing for purposes of clarity of illustration.
Figure 4:
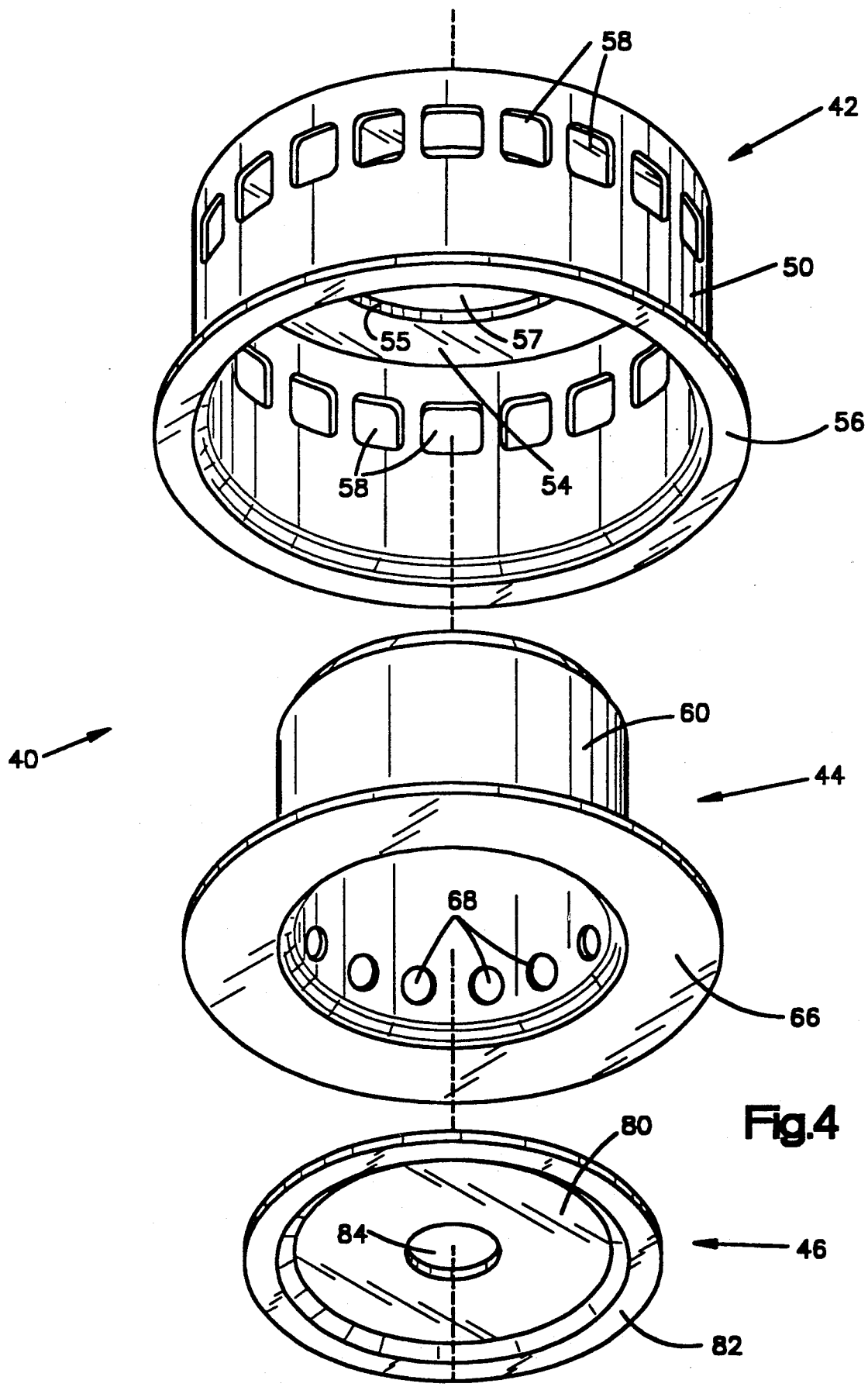
FIG. 4 is an exploded pictorial illustration further illustrating the structure of components of the inflator housing.

The combustion cup 44 is generally cup-shaped, is a single piece of sheet metal, and is disposed inside the diffuser cup 42 (FIGS. 2 and 3). The combustion cup 44 has a cylindrical side wall 60 extending around the axis 52. The cylindrical side wall 60 extends between a flat imperforate circular upper end wall 64 and a flat lower annular flange 66. The flange 66 is disposed in a coaxial relationship with the cylindrical side wall 60 and extends radially outwardly from an end of the side wall 60 opposite from the end wall 64. The upper end wall 64 and the lower flange 66 are parallel to each other and perpendicular to the axis 52. An annular array of openings 68 extends circumferentially around a lower portion of the combustion cup side wall 60.

The upper end wall 64 of the combustion cup 44 is welded, with a circular continuous weld, to the annular surface 55 on the upper end wall 54 of the diffuser cup 42 at a weld location 70, preferably by laser welding. The combustion cup flange 66 is welded with a circular continuous weld to the diffuser cup flange 56 at a weld location 72, also preferably by laser welding. When assembled together, the diffuser cup 42 and the combustion cup 44 define an annular diffuser cup chamber 242 (FIG. 3) that encircles the side wall 60 of the combustion cup.

The cover 46 is also formed from a single piece of sheet metal. The combustion chamber cover 46 is a generally flat circular metal piece having a circular center portion 80 and a parallel but slightly offset annular outer flange 82. A circular opening 84 is located in the center portion 80 of the chamber cover 46. The opening 84 is coaxial with the diffuser and combustion cup side walls 50 and 60. The outer flange 82 of the chamber cover 46 overlaps the combustion cup flange 66 and is welded with a circular continuous weld to the combustion cup flange 66 at a circumferential weld location 86, again preferably by laser welding. The circular weld locations 70, 72 and 86 are coaxial with the central axis 52 of the inflator. The welds may be formed by a Rofin-Sinar 850 $CO_2$ Laser.

A hermetically sealed canister 90 (FIG. 2) is disposed in the chamber 240 (FIG. 3) defined by the combustion cup 44. The canister 90 is made of two pieces, namely a lower canister section 92 and a cover 94. The radially outer edge of the canister cover 94 is crimped to an adjacent edge of the canister lower section 92 to seal the canister 90 hermetically. The canister 90 is preferably made of relatively thin aluminum The canister lower section 92 (FIG. 2) has a cylindrical outer side wall 96 adjacent to and inside the combustion cup side wall 60. The side wall 96 has a reduced thickness in the area adjacent the openings 68 in the combustion cup side wall 60. The canister lower section 92 also has a cylindrical inner side wall 98 spaced radially inwardly from the outer side wall 96. The side wall 98 has a reduced thickness in the area adjacent an igniter 142.

A flat ring-shaped lower wall 100 of the canister lower section 92 interconnects the outer side wall 96 and the inner side wall 98. A circular inner top wall 102 of the canister lower section 92 extends radially inwardly from and caps the inner side wall 98. The inner top wall 102 and the cylindrical inner side wall 98 define a downwardly opening central recess 104 in the canister 90.

The canister cover 94 is generally circular in shape. A recess 106 is located in the center of the canister cover 94. A packet 108 of auto ignition material is located in the recess 106 and held in the recess 106 by a piece of aluminum foil tape 109.

A plurality of annular disks 110 of gas generating material are stacked atop each other within the canister 90. An annular cushion 112 is disposed between the uppermost gas generating disk 114 and the inside of the canister cover 94. The disks 110 are made of a known material which when ignited generates nitrogen gas. Although many types of gas generating material could be used, suitable gas generating materials are disclosed in U.S. Pat. No. 3,895,098. Although the gas generating material is formed into disks 110, the gas generating material could be formed into other shapes, such as pellets.

An annular prefilter 120 is disposed in the canister 90. The prefilter 120 is located radially outward of the gas generating disks 110 and radially inward of the outer side wall 96 of the canister 90. A small annular space exists between the prefilter 120 and the outer side wall 96.

An annular slag screen indicated schematically at 122 is located in the diffuser cup 42, outside of the combustion cup 44. The slag screen 122 is radially outward of the openings 68 and lies against the combustion cup side wall 60. However, the slag screen 122 could be spaced away from the openings 68 in the combustion cup side wall 60.

An annular final filter assembly indicated schematically at 124 is located inside the diffuser cup 42 above the slag screen 122. The final filter assembly 124 is radially inward of the gas outlet openings 58 in the side wall 50 of the diffuser cup 42. The final filter assembly 124 is a plurality of layers of various materials. The layers extend around the diffuser cup side wall 50 and are located inside the side wall. The detailed structure of the final filter assembly 124 does not form a part of the present invention and therefore will not be described in detail.

An annular filter shield 126 projects radially inwardly from the diffuser cup side wall 50 and separates the final filter assembly 124 and the slag screen 122. An annular graphite seal 128 seals the gap between the upper edge of the final filter assembly 124 and the inside of the diffuser cup upper end wall 54. Another annular graphite seal 130 seals the gap between the lower edge of the final filter assembly 124 and the upper side of the filter shield 126.

The inflator 10 includes an initiator assembly 140. The initiator assembly 140 projects through the opening 84 in the chamber cover 46 into the central recess 104 of the canister 90. The initiator assembly 140 includes the igniter 142 and a weld adaptor 150. The igniter 142 and the weld adaptor 150 are connected together. The weld adaptor 150 is welded with a continuous weld, preferably a laser weld, to the center portion 80 of the chamber cover 46 at a circumferential weld location 144. The weld adaptor strengthens the chamber cover 46.

The initiator assembly 140 includes the igniter 142. The igniter 142 includes a pair of wire leads 146 which extend outwardly from the initiator assembly 140. The wire leads 146 are connectable to a collision sensor (not shown). The wire leads 146 are connected to a resistance wire embedded in an ignition material in the igniter 142. The igniter 142 may be of any suitable well known construction. A thin plastic film (not shown) is locate on the outside of the upper portion of the igniter 142, to prevent metal-to-metal contact which could ground the igniter 142 and disable the inflator 10.

Upon the occurrence of a collision or other sudden vehicle deceleration, the collision sensor closes an electrical circuit. An electrical current then flows through the wire leads 146 to the igniter 142. The resistance wire sets off the ignition material which ignites a charge in the igniter 142. Ignition of the charge forms hot gas products which flow outwardly from the igniter 142 and rupture the inner top wall 102 and the inner side wall 98 of the canister 90 The hot gas from the igniter 142 ignites the disks 110 of gas generating material. The disks 110 of gas generating material rapidly produce a large volume of another hot gas.

The pressure of the gas acts on the cylindrical side wall 96 of the canister 90, forcing the side wall 96 radially outwardly against the combustion cup side wall 60. This results in the thin side wall 96 of the canister 90 being ruptured or blown out at the openings 68 in the combustion cup side wall 60. The reduced thickness of the side wall 96 adjacent the openings 68 allows this portion of the side wall 96 to rupture in preference to other portions at a desired pressure. The gas generated by burning of the disks 110 then flows radially outwardly through the prefilter 120. The prefilter 120 removes from the flowing gas some combustion products of the initiator assembly 140 and of the gas generating disks 110. The prefilter 120 also cools the flowing gas. When the gas cools, molten products are plated onto the prefilter 120. The gas flows through the openings 68 and into the slag screen 122.

The slag screen 122 removes and traps particles from the flowing gas. The slag screen also cools the flowing gas. When the gas cools, molten combustion products such as metal are plated onto the slag screen 122. The filter shield 126 between the slag screen 122 and the final filter assembly 124 causes turbulent flow of gas to occur in and around the slag screen 122. The turbulent gas flow promotes the retention of relatively heavy particles in the slag screen 122 and in the lower portion of the diffuser cup 42.

The gas flows axially upwardly from the slag screen 122 to the final filter assembly 124. The gas then flows radially outwardly through the final filter assembly 124 which removes small particles from the gas. The final filter assembly 124 also further cools the gas so that molten products in the gas may deposit on parts of the final filter assembly 124. The annular array of gas outlet openings 58 directs the flow of gas into the air bag 12 to inflate the air bag 12.

Inflator Housing—Construction

As described above, the diffuser cup 42, the combustion cup 44, and the cover 46 are interconnected by the three circular welds 70, 72 and 86 (FIG. 3). The welds 70, 72 and 86 have central axes which are coincident with the central axes of the diffuser cup 42 and combustion cup 44.

The annular end wall 54 of the diffuser cup 42 is disposed in overlapping engagement with the circular end wall 64 of the combustion cup 44. A radially extending flat inner side surface 162 (FIG. 3)of the diffuser cup end wall 54 is disposed in abutting engagement with the circular upper side surface 164 of the combustion cup end wall 64. Thus, the end wall 54 of the diffuser cup 42 strengthens the end wall 64 of the combustion cup 44.

A flat annular lower side surface 168 on the diffuser cup flange 56 is disposed in flat abutting engagement with an annular upper side surface 170 on the combustion cup flange 66. The flanges 56 and 66 on the diffuser cup 42 and combustion cup 44 cooperate to strengthen the lower portion of the diffuser cup and the combustion cup.

An annular flat lower side surface 174 on the combustion cup flange 66 is disposed in abutting engagement with an annular upper side surface 176 of the cover flange 82. The cover 46 cooperates with the combustion cup flange 66 to strengthen the lower portion of the combustion cup 44. Since the combustion cup flange 66 is connected with the diffuser cup flange 56, the cover 46 also strengthens the diffuser cup 42. The adaptor 150 (FIG. 2) is welded at 144 to the cover 46 and strengthens the cover.

Inflator Housing—Strain Hardening

The side walls 50 and 60 and flanges 56 and 66 of the diffuser cup 42 and combustion cup 44 (FIGS. 3 and 4) are strain hardened to increase their yield strength and ultimate tensile strength. The strain hardening of the side walls 50 and 60 and flanges 56 and 66 occurs during drawing of flat circular blanks to form the diffuser cup 42 and combustion cup 44. In one specific embodiment of the invention in which the diffuser cup 42 and combustion cup 44 were drawn from UNS S30100 stainless steel blanks, the ultimate tensile strength of the strain hardened portions of the diffuser and combustion cups was increased by as much as 100% (percent) of the ultimate tensile strength of the blanks before the blanks were cold worked. This increase in ultimate tensile strength enables the inflator housing 40 to withstand relatively large pressure forces without failing.

When the combustion cup 44 is formed from the flat circular blank, a punch applies force against a central portion of the blank and forces the blank downwardly into a draw ring. As the punch moves downwardly into the draw ring, the blank is pulled into the draw ring. As the blank is pulled into the draw ring, it plastically deforms and is cold worked. The punch moves into the draw ring for a distance which is sufficient to form the side wall 60 of the combustion cup 44 with an axial extent which is at least twenty (20) times the thickness of the blank from which the combustion cup is formed. This cold working of the metal forming the combustion cup 44 results in a strain hardening of the metal which forms the side wall of the combustion cup.

The strain hardened metal of the cylindrical side wall 60 of the combustion cup 44 has an average yield strength and an average ultimate tensile strength which are at least 1.2 times (i.e., 20 percent greater than) the average yield strength and ultimate tensile strength of the imperforate circular end wall 64. Generally speaking, the end wall 64 has yield and ultimate tensile strengths which are close to the yield and ultimate tensile strengths of the blank from which the combustion cup 44 was formed. For example, the average yield strength of the combustion cup side wall 60 is typically greater than 120,000 pounds per square inch, while the end wall 64 has an average yield strength of less than 100,000 pounds per square inch.

The extent of the increase in the yield strength and ultimate tensile strength of the side wall 60 of the combustion cup 44 is a direct function of the extent to which the side wall of the combustion cup is strain hardened during formation of the combustion cup. The extent of strain hardening of the side wall 60 of the combustion cup 44 varies as a function of the amount of plastic deformation of the blank during the drawing process. Therefore, the deeper the draw, the greater the strain hardening of the metal and the higher the yield strength and ultimate tensile strength of the side wall 60 of the combustion cup 44.

During formation of the combustion cup 44, strain hardening of the metal forming the side wall 60 is not uniform throughout the axial extent of the cylindrical side wall. Therefore, the yield strength and ultimate tensile strength of the combustion cup side wall 60 is not uniform throughout the axial extent of the side wall. The greatest strain hardening of the metal of the blank occur in the side wall 60 adjacent to the annular flange 66.

The amount of deformation of the blank to form the combustion cup side wall 60 increases in a generally uniform manner from the end wall 64 to the flange 66. Therefore, the yield strength and ultimate tensile strength of the combustion cup side wall 60 increases in a generally uniform manner from the end wall 64 to the flange 66. However, localized variations occur in the amount of strain hardening in the combustion cup side wall 60 due to variations in the flow of metal during drawing of the blank and irregularities in the composition of the material of the blank.

Figure 5:
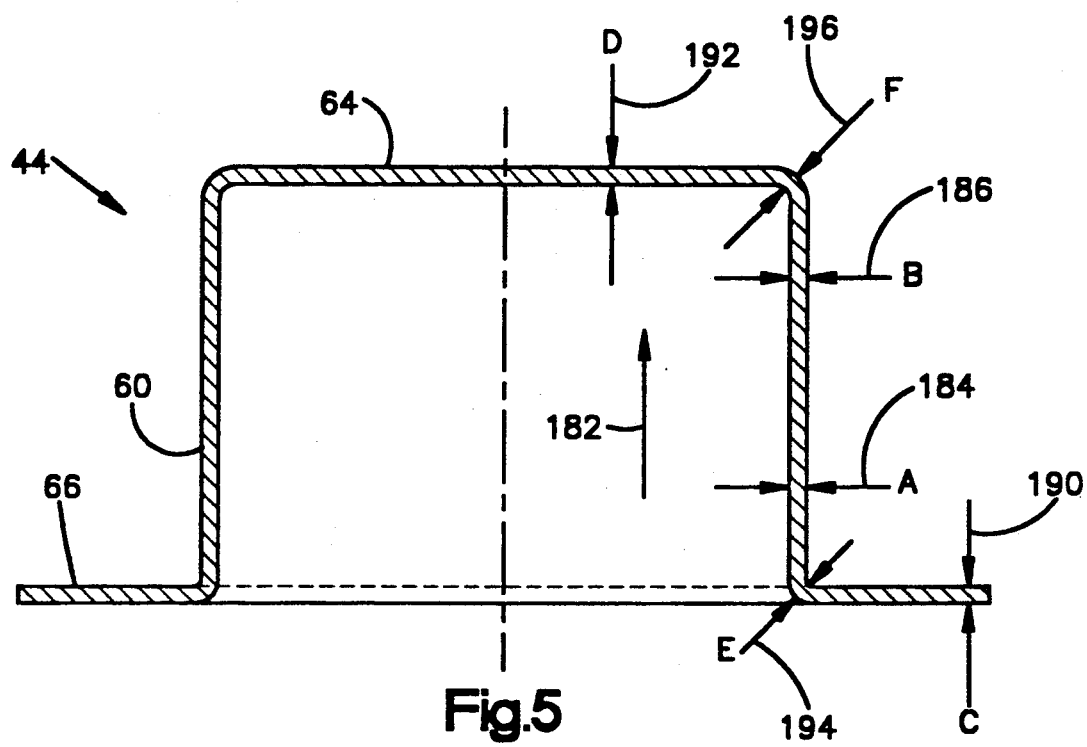
FIG. 5 is a schematic illustration of a part of the housing of FIG. 3.

The thickness of the combustion cup side wall 60 decreases as it extends in the direction of the arrow 182 in FIG. 5. Thus, the cylindrical combustion cup side wall 60 is thicker adjacent to the annular flange 66 than adjacent to the circular end wall 64. This change in thickness of the combustion cup side wall 60 is the result of flow of the metal of the blank as the blank is pulled into the die by the punch during fabrication of the combustion cup. The openings 68 (FIGS. 3 and 4) are formed after drawing the combustion cup 44.

One specific embodiment of the combustion cup 44 was drawn from a circular UNS S30100 stainless steel blank. The stainless steel blank had a nominal thickness of 1.20 to 1.35 mm. and a diameter of 119.0 mm. This specific blank was drawn to form a cylindrical combustion cup side wall 60 having an axial extent of 35.25 mm. The combustion cup flange 66 had an outer diameter of 86.50 mm. The combustion cup end wall 64 had a diameter of 52.75 mm. The thickness of the combustion cup side wall 60 adjacent to the flange 66 was 1.21 mm. at the location indicated by the arrows 184 in FIG. 5. At the location indicated by the arrows 186 in FIG. 5, the combustion cup side wall 60 had a thickness of 0.80 mm. The combustion cup flange 66 had a thickness of 1.16 mm. at the location indicated by the arrows 190 in FIG. 5. The combustion cup end wall 64 had a thickness of 0.95 mm. at the location indicated by the arrows 192 in FIG. 5. A corner between the side wall 60 and flange 66 of the combustion cup 44 had a thickness of 1.14 mm. at the location indicated by the arrows 194. At the corner between the side wall 60 and end wall 64 of the combustion cup 44, the metal had a thickness of 0.75 mm. at the location indicated by the arrows 196.

Due to the specific characteristics of the blank and the manner in which the metal of the blank flowed during drawing, the hardness of the side wall 60 of this specific combustion cup 44 varied at locations which were the same distance from the end wall 64. Similarly, the hardness of the metal of the end wall 64 and flange 66 varied across the end wall and flange. However, the side wall 60 of this specific combustion cup 44 had an average hardness of approximately 60 HR30N (Hardness Rockwell with a 30 kg load using a diamond indenter). The end wall 64 had an average hardness of approximately 5.0 HR30N. Thus, the side wall 60 of the combustion cup 44 had an average hardness which is at least 1.2 times the average hardness of the end wall 64. The flange 66 had an average hardness of approximately 58 HR30N.

Figure 6:
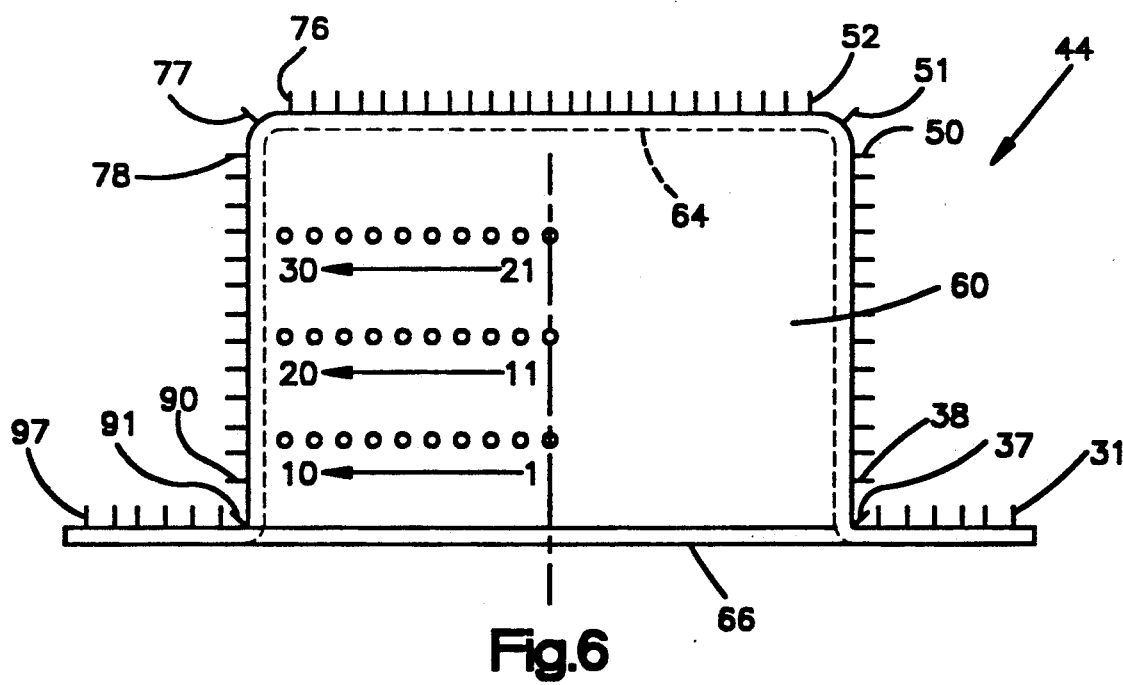
FIG. 6 is another schematic illustration of the part of the housing shown in FIG. 5.

The hardness of the combustion cup was measured at 97 locations on the surface of the combustion cup. These locations have been indicated in FIG. 6. Locations 1 through 30 are disposed in three circumferentially extending rows on the cylindrical outer surface of the side wall 60 of the combustion cup 44 (FIG. 6). Locations 31 to 37 extend radially inwardly from the right (as viewed in FIG. 6) edge of the flange 66. Locations 38 through 50 are in an axially extending row along the side wall 60 of the combustion cup. Location 51 is at a corner between combustion cup side wall 60 and the end wall 64 of the combustion cup. Locations 52 to 76 are in a row which extends diametrically across combustion cup end wall 64. Location 77 (FIG. 6) is at a corner between side and end walls 62 and 64 of the combustion cup 44 and is disposed diametrically opposite from location 51. Locations 78 to 90 are in an axially extending row along the combustion cup side wall 60 and are diametrically opposite from locations 38 to 50. Locations 91 to 97 are in a radially extending row on the combustion cup flange 66 diametrically opposite from locations 31-37.

The hardness at the various locations designated 1 through 97 in FIG. 6 was measured on an HR30N scale. The HR30N scale is a Rockwell Superficial Hardness Number with a 30 kg load using a diamond indenter. This scale was used because of the thinness of the material of the combustion cup 44 and the hardness of the various locations on the surface of the combustion cup.

The measured hardnesses at the various locations on the combustion cup were as follows:

| Location | HARDNESS HR30N | Location | HR30N | Location | HR30N |
| --- | --- | --- | --- | --- | --- |
| 1 | 62.6 | 33 | 59.8 | 65 | 49.9 |
| 2 | 63.0 | 34 | 62.4 | 66 | 49.6 |
| 3 | 61.9 | 35 | 63.9 | 67 | 49.9 |
| 4 | 62.3 | 36 | 64.4 | 68 | 49.8 |
| 5 | 62.5 | 37 | 65.1 | 69 | 49.5 |
| 6 | 62.4 | 38 | 64.0 | 70 | 49.2 |
| 7 | 61.9 | 39 | 61.0 | 71 | 50.0 |
| 8 | 59.6 | 40 | 60.9 | 72 | 49.7 |
| 9 | 61.8 | 41 | 60.6 | 73 | 50.0 |
| 10 | 62.5 | 42 | 61.9 | 74 | 50.1 |
| 11 | 61.2 | 43 | 60.9 | 75 | 50.1 |
| 12 | 61.2 | 44 | 61.2 | 76 | 51.9 |
| 13 | 61.0 | 45 | 59.8 | 77 | 56.0 |
| 14 | 62.0 | 46 | 58.6 | 78 | 54.0 |
| 15 | 60.2 | 47 | 58.4 | 79 | 57.6 |
| 16 | 60.9 | 48 | 58.2 | 80 | 57.7 |
| 17 | 60.7 | 49 | 57.3 | 81 | 59.0 |
| 18 | 61.2 | 50 | 58.1 | 82 | 59.8 |
| 19 | 64.2 | 51 | 58.1 | 83 | 60.8 |
| 20 | 61.1 | 52 | 53.0 | 84 | 62.9 |
| 21 | 58.5 | 53 | 51.6 | 85 | 63.2 |
| 22 | 58.7 | 54 | 49.9 | 86 | 63.4 |
| 23 | 57.9 | 55 | 50.8 | 87 | 53.4 |
| 24 | 58.4 | 56 | 50.7 | 88 | 52.7 |
| 25 | 59.3 | 57 | 49.3 | 89 | 53.9 |
| 26 | 62.8 | 58 | 50.5 | 90 | 61.6 |
| 27 | 58.6 | 59 | 50.2 | 91 | 65.0 |
| 28 | 59.9 | 60 | 49.5 | 92 | 64.9 |
| 29 | 55.9 | 61 | 50.6 | 93 | 62.6 |
| 30 | 58.0 | 62 | 50.0 | 94 | 61.2 |
| 31 | 58.6 | 63 | 48.9 | 95 | 60.7 |
| 32 | 58.0 | 64 | 49.9 | 96 | 57.6 |
| | | | | 97 | 58.2 |

The yield strength and ultimate tensile strength of the combustion cup 44 is a direct function of the hardness of the metal. Thus, the harder the metal, the greater the yield strength of the metal. A UNS S30100 stainless steel which has an HR30N hardness of 50 has a yield strength of approximately 90,000 pounds per square inch. A UNS S30100 stainless steel which has an HR30N hardness of 60 has a yield strength of approximately 140,000 pounds per square inch. With hardnesses of these general magnitudes, a unit increase in HR30N hardness corresponds to an increase of approximately 5,000 pounds per square inch in yield strength of UNS S30100 stainless steel.

In the foregoing description of the combustion cup 44, specific dimensions and materials have been set forth for the blank from which the combustion cup is formed and for the combustion cup itself. In addition, specific hardnesses have been set forth for various locations on the combustion cup 44. It should be understood that these materials, dimensions and hardnesses have only been set forth herein for purposes of clarity of description and not for purposes of limitation of the invention. It is contemplated that the combustion cup 44 could be formed of many different materials from blanks of many different dimensions. The combustion cup 44 itself could have different dimensions and hardnesses. In fact, it is contemplated that specific combustion cups of a series of combustion cups 44 of the same overall size and made of the same material from blanks of the same size may have different wall thicknesses and/or hardnesses.

The diffuser cup 42 is formed in the same manner as the combustion cup 44. Thus, the diffuser cup 42 is drawn by applying force against a central portion of an annular blank with a punch. As the punch pulls the metal of the blank into a draw ring, the metal is cold worked. The punch moves into the draw ring for a distance which is sufficient to form the side wall 50 of diffuser cup 42 with an axial extent which is at least twenty (20) times the thickness of the blank from which the diffuser cup is formed. This results in a strain hardening of the metal which forms the side wall 50 and flange 56 of the diffuser cup 42. The circular central opening 57 is formed in the blank from which the diffuser cup is formed. The side wall openings 58 (FIGS. 3 and 4) are formed after the drawing operation is completed.

The strain hardened metal of the side wall 50 and flange 56 of the diffuser cup 42 has an average yield strength and an average ultimate tensile strength which are at least 1.2 times (i.e., 20 percent greater than) the average yield strength and ultimate tensile strength of the end wall 54. For example, the average yield strength of the cylindrical diffuser cup side wall 50 is typically greater than 120,000 pounds per square inch, while the annular end wall 54 has an average yield strength of less than 100,000 pounds per square inch. The average yield strength of the diffuser cup side wall 50 is at least 20 percent greater than the average yield strength of the diffuser cup end wall 54. The extent of strain hardening of the metal of the diffuser cup 42 will vary as a function of the plastic deformation of the metal during the drawing process. Therefore, the deeper the draw, the greater the strain hardening of the metal and the higher the yield strength and the ultimate tensile strength of the metal.

In one specific instance, the diffuser cup 42 was drawn from a circular UNS S30100 stainless steel blank having a nominal thickness of 1.20 to 1.35 mm. This specific blank had a diameter of 134.0 mm. and was drawn to form a cylindrical diffuser cup side wall 50 having an axial extent of 35.25 mm. The annular diffuser cup flange 56 had a diameter of 91.50 mm. The annular diffuser cup end wall had a diameter of 76.50 mm.

Figure 7:
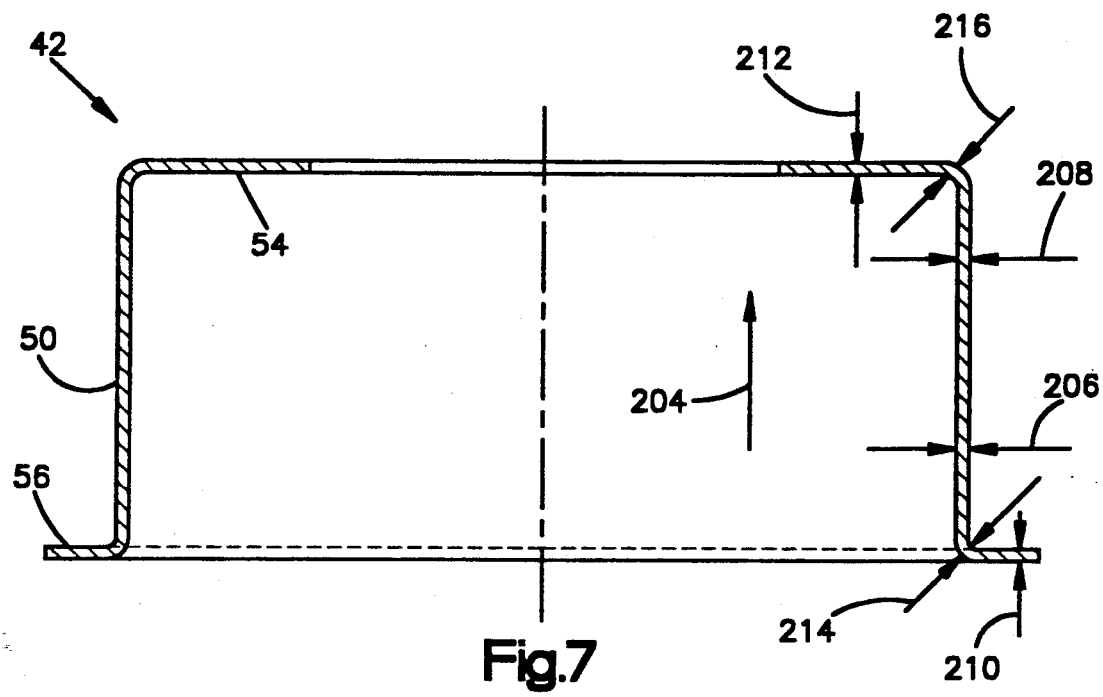
FIG. 7 is a schematic illustration of another part of the housing of FIG. 3.

During the drawing process, the diffuser cup side wall 50 was formed with a thickness which decreased in the direction of the arrow 204 in FIG. 7. In the location indicated by the arrows 206, the diffuser cup side wall 50 had a thickness of approximately 1.10 mm. The cylindrical diffuser cup side wall 50 tapered to a thickness of approximately 0.79 mm. at the location indicated by the arrows 208 in FIG. 7.

The annular flange 56 of this specific diffuser cup 42 had a thickness of 1.23 mm. at the location indicated by the arrows 210 in FIG. 7. The annular diffuser cup end wall 54 had a thickness of 0.90 mm. at the location indicated by the arrows 212. The corner between the flange 56 and the side wall 50 of the diffuser cup 42 had a thickness of 1.05 mm. at the location indicated by the arrows 214. The corner between the side wall 50 and the end wall 54 of the diffuser cup 42 had a thickness of 0.70 mm. at the location indicated by the arrows 216.

The hardness of the diffuser cup 42 varied around the side wall 50 at locations which were the same distance from the end wall 54. Similarly, the hardness of the end wall varied across the end wall. However, generally speaking, for this particular diffuser cup 42, the flange 56 had an average hardness of approximately 61 HR30N (Hardness Rockwell with a 30 kg load using a diamond indenter). The side wall of this specific diffuser cup had a hardness which varied from a maximum of approximately 61 HR30 adjacent to the flange to a minimum of approximately 51 HR30N adjacent to the end wall 54. The average hardness of the side wall was approximately 57 HR30N. The end wall had an average hardness of approximately 51 HR30N.

The hardness at various locations on the surface of the diffuser cup 42 varies as a direct function of the extent of cold working of the metal of the diffuser cup at these locations. The greater the cold working, the greater the strain hardening and the greater the yield strength and ultimate tensile strength of the material.

During the forming of the diffuser cup 42 by a drawing operation, the metal of a flat circular blank flows around the punch and into a circular die ring. Thus, the metal of the blank is drawn into the die with a resulting reduction in the diameter of the blank during the drawing operation. Thus, during the drawing operation of the specific diffuser cup 42 previously referred, the diameter of the blank was reduced from 134.0 mm. to approximately 95.0 mm. The punch diameter was 76.5 mm.

Figure 8:
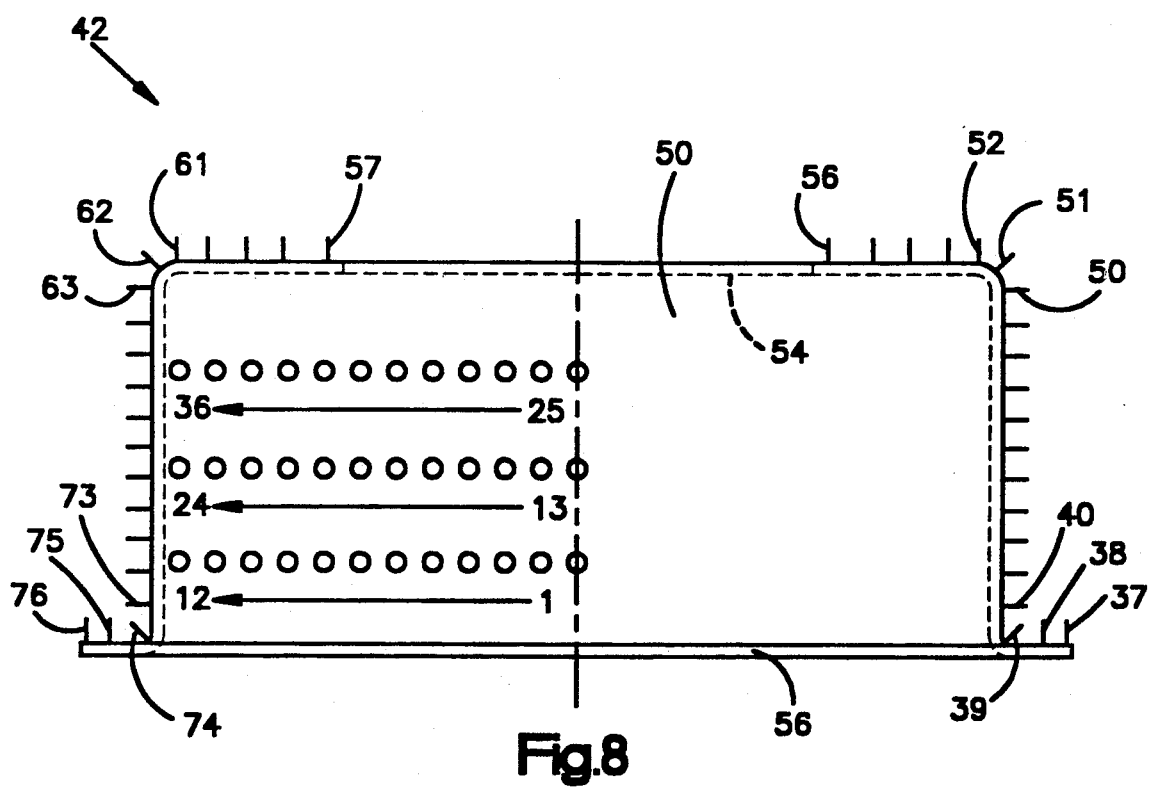
FIG. 8 is another schematic illustration of the part of the housing shown in FIG. 7.

In the specific diffuser cup 42 previously referred to, the hardness of the diffuser cup was measured at 76 locations on the surface of the diffuser cup (FIG. 8). Locations 1-36 are disposed in three circumferentially extending rows on the outer side surface of the diffuser cup side wall 50. Locations 37 to 39 extend radially inwardly from the right edge (as viewed in FIG. 8) of the diffuser cup flange 56. Locations 40 through 50 are in an axially extending row along the diffuser cup side wall 50. Location 51 is at a corner between diffuser cup side wall and the end wall 54.

Locations 52 through 61 are disposed in a row which extends diametrically across the end wall 54 of the diffuser cup 42. Location 62 is at a corner between the diffuser cup side wall 50 and the end wall 54 and is diametrically opposite from location 51. Locations 63 through 73 are disposed in an axially extending row along the diffuser cup side wall 50 and are diametrically opposite from locations 40-50. Locations 74 to 76 are in a radially extending row on the diffuser cup flange 56 diametrically opposite from locations 37-39.

The measured hardness at the various locations on the diffuser cup 42 were as follows:

| HARDNESS | | | | | |
|---|---|---|---|---|---|
| Location | HR30N | Location | HR30N | Location | HR30N |
| 1 | 60.2 | 26 | 52.8 | 51 | 52.0 |
| 2 | 59.7 | 27 | 53.0 | 52 | 53.0 |
| 3 | 60.9 | 28 | 53.9 | 53 | 52.3 |
| 4 | 60.0 | 29 | 52.6 | 54 | 50.1 |
| 5 | 59.8 | 30 | 52.9 | 55 | 50.5 |
| 6 | 61.1 | 31 | 53.3 | 56 | 50.2 |
| 7 | 60.5 | 32 | 51.8 | 57 | 49.6 |
| 8 | 60.4 | 33 | 53.0 | 58 | 49.9 |
| 9 | 59.7 | 34 | 52.8 | 59 | 50.4 |
| 10 | 60.6 | 35 | 53.1 | 60 | 51.2 |
| 11 | 61.0 | 36 | 54.0 | 61 | 50.9 |
| 12 | 61.0 | 37 | 63.1 | 62 | 51.6 |
| 13 | 56.5 | 38 | 64.0 | 63 | 52.3 |
| 14 | 57.0 | 39 | 62.9 | 64 | 50.0 |
| 15 | 57.1 | 40 | 61.3 | 65 | 47.7 |
| 16 | 58.2 | 41 | 61.0 | 66 | 54.0 |
| 17 | 58.0 | 42 | 61.2 | 67 | 56.7 |
| 18 | 57.8 | 43 | 60.5 | 68 | 57.7 |
| 19 | 58.5 | 44 | 59.4 | 69 | 58.9 |
| 20 | 58.0 | 45 | 58.5 | 70 | 59.3 |
| 21 | 57.6 | 46 | 58.0 | 71 | 60.4 |
| 22 | 58.4 | 47 | 55.0 | 72 | 60.8 |
| 23 | 58.9 | 48 | 49.2 | 73 | 61.2 |
| 24 | 59.6 | 49 | 49.0 | 74 | 60.2 |
| 25 | 51.4 | 50 | 48.2 | 75 | 59.3 |

-continued

| HARDNESS | | | | | |
|---|---|---|---|---|---|
| Location | HR30N | Location | HR30N | Location | HR30N |
| | | | | 76 | 57.2 |

It should be understood that the foregoing specific material, dimensions and hardnesses for the diffuser cup 42 have been set forth herein for purposes of clarity of description. It is contemplated that the diffuser cup 42 could be formed of different materials and have different dimensions and hardnesses. In fact, it is contemplated that specific diffuser cups of a series of diffuser cups 42 of the same overall size and made of the same material from blanks of the same size may have different wall thicknesses and/or hardnesses.

Although the cover 46 is not deformed to anywhere near the same extent as the diffuser cup 42 and combustion cup 44, the cover 46 is deformed to have a flange 82 and center portion 80. The cover 46 is formed by drawing a blank by applying force at the central portion of the blank with a punch. As the blank is drawn, it is plastically deformed and cold worked. This results in strain hardening of the metal which forms the flange 82. The strain hardened metal of the flange 82 has a higher average yield strength than the average yield strength of the center portion 80.

In one specific example, the cover 46 was drawn from a circular UNS S30100 stainless steel blank having a nominal thickness of 1.20 to 1.35 mm. and a diameter of 69.00 mm. This blank was drawn to form a cover having a central portion which was offset from the flange portion an axial distance of 1.27 mm. The cover flange 82 had an outside diameter of 63.00 mm. The center portion 80 of this specific cover had a diameter of 49.00 mm.

During the drawing process, the cover 46 was formed with a thickness which was different at different portions of the cover. Thus, the flange 82 had a thickness of 1.15 mm. at the location indicated by the arrows 222 in FIG. 9. The center portion 80 of the cover had a thickness of 1.1 mm. at a location indicated by the arrows 224 in FIG. 9. At the location indicated by the arrows 226 in FIG. 9, the cover had a thickness of 1.12 mm. At the location indicated by the arrows 228 in FIG. 9, the thickness of the cover was 1.07 mm.

The hardness of the cover varied across the cover at locations which were the same distance from the center of the cover. However, generally speaking, for this specific cover, the flange had an average hardness of approximately 81.5 HRB (Hardness Rockwell with a 100 Kg. load using a 1/16 inch diameter ball). The center portion of this specific cover had an average hardness of approximately 85 HRB.

The hardness at various locations on the cover 46 varied as a direct function of the extent of cold working at these locations in the cover. The greater the cold working, the greater the strain hardening, and the greater the yield strength of the material forming the cover. During forming of the cover 46 by a drawing operation, the diameter of the blank was reduced from 69.00 mm. to approximately 65.0 mm.

In this specific cover 46, the hardness of the cover was measured at 32 locations on the surface of the cover (FIG. 10). Locations 1, 2, 15, 16, 17, 18, 31 and 32 (FIG. 10) are located in pairs at four equally spaced apart locations about the flange 82 of the cover. Locations 3-14 and 19-30 are located in two diametrically extending and intersecting rows on the center portion 80 of the cover. The hardness at the various locations was as follows:

| HARDNESS | |
|---|---|
| Location | HRB |
| 1 | 80.0 |
| 2 | 82.6 |
| 3 | 87.1 |
| 4 | 84.7 |
| 5 | 84.3 |
| 6 | 83.1 |
| 7 | 83.7 |
| 8 | 85.1 |
| 9 | 83.9 |
| 10 | 83.4 |
| 11 | 83.3 |
| 12 | 84.1 |
| 13 | 85.7 |
| 14 | 87.3 |
| 15 | 81.2 |
| 16 | 84.4 |
| 17 | 80.0 |
| 18 | 80.7 |
| 19 | 88.0 |
| 20 | 85.9 |
| 21 | 83.8 |
| 22 | 82.7 |
| 23 | 82.5 |
| 24 | 83.0 |
| 25 | 86.2 |
| 26 | 84.3 |
| 27 | 84.1 |
| 28 | 84.8 |
| 29 | 86.1 |
| 30 | 88.1 |
| 31 | 82.1 |
| 32 | 81.4 |

The yield strength of the material of the cover 46 is a direct function of the hardness of the metal. Thus, the harder the metal, the greater the yield strength and ultimate tensile strength of the metal. Thus, a UNS S30100 stainless steel cover which has an HRB hardness of 80 has a yield strength of approximately 30,000 pounds per square inch.

It should be understood that the foregoing material, dimensions and hardnesses for one specific cover 46 have been set forth herein for purposes of clarity of description It is contemplated that the cover 46 could be formed of different materials with different dimensions and hardnesses.

Inflator Housing—Operation

As described above, upon the occurrence of sudden vehicle deceleration, the initiator assembly 140 is activated to initiate deflagration of the disks 110 of gas generating material As the disks 110 deflagrate, hot nitrogen gas is produced. During the generation of gas by deflagration of the disks 110 of gas generating material, the fluid pressure in the cylindrical combustion cup chamber 240 (FIG. 3) increases This fluid pressure is sufficient to deform the inflator housing 40 plastically in the manner illustrated in FIG. 11. As the hot nitrogen gas flows through the combustion cup openings 68 into the diffuser cup 42, the fluid pressure in the annular diffuser cup chamber 242 also increases.

The maximum fluid pressure which builds up in the diffuser cup chamber 242 is less than the maximum fluid pressure which builds up in the combustion cup chamber 240. This is in part due to the openings 68 in the side wall 60 of the combustion cup 44 being smaller and fewer in number than the openings 58 in the side wall 50 of the diffuser cup 42. Also, the temperature of the gas in the diffuser cup chamber 242 is lower than the temperature of the gas in the combustion cup chamber 240. The effect of the higher pressure of the gas in the combustion cup chamber 240 results in the combustion cup 44 being plastically deformed to a greater extent than the diffuser cup 42.

Figure 11:
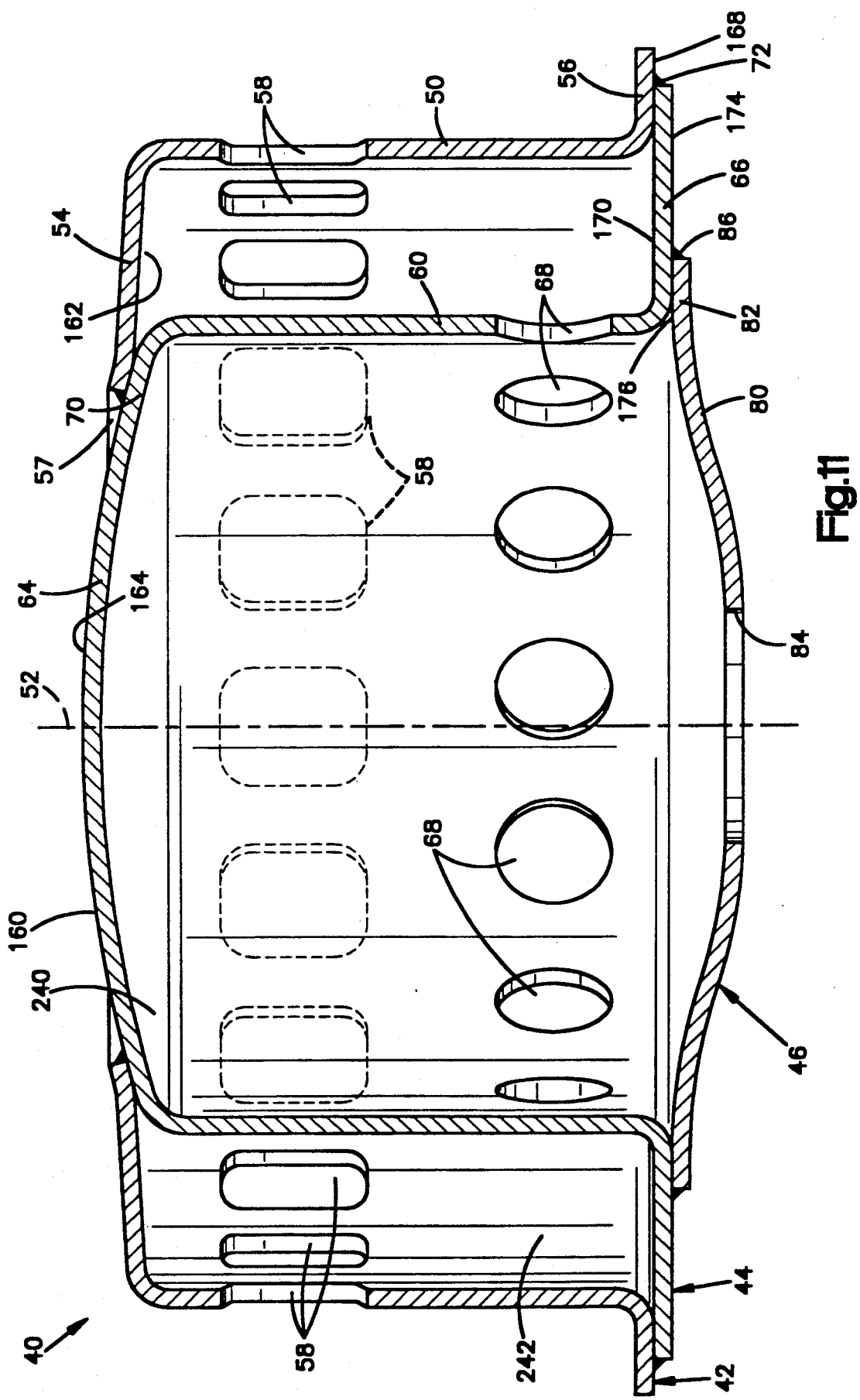
FIG. 11 is a schematic sectional view illustrating the manner in which the housing of FIG. 3 is deformed during normal deployment of an air bag in the safety apparatus of FIG. 1.

The fluid pressure in the combustion cup chamber 240 causes the end wall 64 and the cover 46 to deform plastically in an axially outward direction (FIG. 11). The overlapping relationship between the diffuser cup end wall 54 and the combustion cup end wall 64 enables force to be transmitted from the end wall of the combustion cup 44 to the end wall of the diffuser cup 42. The force is transmitted through the annular weld 70 which interconnects the diffuser cup end wall 54 and combustion cup end wall 64. The end wall 54 of the diffuser cup 44 restrains, but does not prevent, axially outward deformation of the end wall 64 of the combustion cup 44. The combustion cup end wall 64 deforms sufficiently to extend through the opening 57 in the diffuser cup end wall 54.

During formation of the combustion cup 44, there is almost no work hardening of the end wall 64. Therefore, the combustion cup end wall 64 has a relatively-low yield strength and is relatively ductile The relatively low yield strength of the combustion cup end wall 64 enables it to start to deform before other portions of the combustion cup 44 start to deform under the influence of increasing gas pressure in the chamber 240. The ductility of the combustion cup end wall 64 enables it to deform plastically to a relatively large extent without rupturing. To prevent excessive deformation of the combustion cup end wall 64, the diffuser cup end wall 54 retards outward bulging of the combustion cup end wall 64.

As the fluid pressure in the combustion cup chamber 240 increases, the cover 46 plastically deforms or bulges in the opposite direction from the end wall 64 (FIG. 11). The weld 86 at the overlap between the cover 46 and combustion cup flange 66 restrains the cover from excessive plastic deformation. Although the cover 46 is work hardened to some extent by the formation of the center portion 80 and flange 82, the resulting increase in the yield strength of the cover 46 is insufficient to prevent plastic deformation of the cover. By having the center portion 80 of the cover 46 initially offset inwardly from the flange 82 (FIG. 3), the structural strength of the cover to oppose fluid pressure forces in the combustion cup chamber 240 is increased. Nonetheless, as the fluid pressure in the combustion cup chamber 240 increases, both the end wall 64 and the cover 46 plastically deform axially outwardly. Due to the structural reinforcement provided by the diffuser cup end wall 54 for the combustion cup end wall 64 and due to the diameter of the weld 70 between the diffuser cup end wall 54 and combustion cup end wall 64 being smaller than the diameter of the weld 86 between the cover flange 82 and the combustion cup flange 66, there is greater axial deformation of the cover 46 than of the combustion cup end wall 64. The deformation of the cover 46 is reduced by as much as 50 percent by welding the initiator adaptor 150 to the cover at the weld 144.

The side wall 60 of the combustion cup 44 may be deformed in both an axial and a radial direction If the fluid pressure in the combustion cup chamber 240 substantially increases, the axial length of the combustion cup side wall 60 increases In addition, the end portion of the side wall 60 toward the end wall 64 of the combustion cup 44 is deformed radially inwardly as the end wall 64 plastically deforms axially outwardly.

There is minimal plastic deformation of the combustion cup side wall 60 adjacent to the lower flange 66. The relatively small amount of deformation of the combustion cup side wall 60 adjacent to the flange 66 is due, in part at least, to strain hardening of the metal of the side wall 60 as the combustion cup is formed. As was previously explained, the strain hardening of the metal in the combustion cup side wall 60 increases the yield strength of the metal. In addition, the combustion cup side wall 60 has a relatively thick cross sectional area adjacent to the flange 66.

The cover 46, combustion cup flange 66 and diffuser cup flange 56 cooperate to provide structural strength to resist deformation of the lower portion of the combustion cup 44. Specifically, as previously described, flange 82 on the cover 46 overlaps and is welded to the flange 66 on the combustion cup 44. In addition, the combustion cup flange 66 overlaps and is welded to the diffuser cup flange 56. The overlapping relationship between the cover flange 82, combustion cup flange 66 and diffuser cup flange 56 provides a relatively strong structural base for the diffuser cup 42 and combustion cup 44. The strength of the base provided by the cover flange 82, combustion cup flange 66 and diffuser cup flange 56 is promoted by the strain hardening of these flanges during their formation Due to the somewhat lower fluid pressure in the diffuser cup chamber 242, the diffuser cup 42 is not plastically deformed to the same extent as the combustion cup 44. However, the end wall 54 of the diffuser cup 42 may be deformed axially outwardly, in the manner shown in FIG. 11, as the end wall 64 of the combustion cup 44 deforms axially outwardly. Since there is relatively little strain hardening of the diffuser cup end wall 54 during formation of the diffuser cup 42, the end wall of the diffuser cup has a relatively low yield strength and is relatively ductile This enables the end wall 54 of the diffuser cup 42 to deform plastically in an axially outward direction adjacent to the opening 57 under the combined influence of gas pressure in the diffuser cup chamber 242 and the force transmitted from the end wall 64 of the combustion cup 44 to the end wall 54 of the diffuser cup 42.

Although the end wall 54 of the diffuser cup 42 is plastically deformed, the end wall of the diffuser cup is exposed to lower fluid pressure than the end wall 64 of the combustion cup 44. Therefore, the end wall 54 of the diffuser cup 42 deforms to a lesser extent than the end wall 64 of the combustion cup 44. This enables the end wall 54 of the diffuser cup 42 to reinforce the end wall of the combustion cup 64 to reduce deformation of the combustion cup end wall.

The side wall 50 of the diffuser cup 42 may plastically deform somewhat in a radially outwardly direction. However, due to the relatively large amount of strain hardening with a resulting increase in yield strength of the diffuser cup side wall 50, the outward deformation of the side wall is relatively small Overlapping engagement of the diffuser cup flange 56 with the combustion cup flange 66 structurally retains the lower portion of the diffuser cup side wall 50 against deformation.

As described above, the inflator housing 40 (FIGS. 3 and 4) is formed from three pieces of sheet metal and the adaptor 150 which are welded together This results in the inflator housing 40 being relatively light weight, strong, inexpensive to fabricate, and easily assembled. It is possible to form the components of the inflator housing 40 from relatively thin pieces of sheet metal without excessively weakening the components of the inflator housing due to the structural cooperation between the components of the inflator housing and due to strengthening of portions of the components of the inflator housing during fabrication of the components.

Portions of the inflator housing plastically deform under the influence of the hot nitrogen gas during inflation of the airbag 12. The strength of the inflator housing 40 is controlled so that the housing does not rupture or otherwise fail during inflation of the airbag. The plastic deformation of the inflator housing 40 is controlled by increasing the yield strength of portions of the inflator housing This is done by strain hardening of portions of the inflator housing during the formation of the components of the inflator housing The plastic deformation of the inflator housing 40 is also controlled by structural reinforcement of portions of the inflator housing. This enables the inflator housing to be of reduced size and weight without impairing the structural strength of the inflator housing.

To test the strength of the inflator housing 40, the inflator housing was subjected to a hydraulic pressure test. During the hydraulic pressure test, the combustion cup 44 was filled with water at a continuously- increasing pressure. When water began to leak from the inflator housing 40, the test was stopped.

To enable the water pressure to build up in the inflator housing 40, the diffuser cup 42 was formed without openings 58. Since the openings 58 in the side wall 50 of the diffuser cup 42 were eliminated, the water pressure of both the combustion cup chamber 240 and diffuser cup chamber 242 increased as the fluid pressure increased, the housing 40 deformed in the manner illustrated schematically in FIG. 12. It should be noted that the diffuser cup 42 deformed to a greater extent than occurs during normal deployment of an air bag 12 (see FIG. 11).

From the above description of the invention, those skilled in the art will perceive improvements, changes and modifications. Such improvements, changes and modifications within the skill of the art are intended to be covered by the appended claims.

Having described the invention, the following is claimed:

1. An apparatus for inflating a vehicle occupant restraint, said apparatus comprising:
an inflator housing; and
gas generating material disposed in said inflator housing for supplying gas to inflate the occupant restraint,
said inflator housing including,
a one-piece combustion cup in which said gas generating material is disposed, said one-piece combustion cup including a first axially extending side wall which also extends around said gas generating material, a first end wall which extends inwardly from one end of said first side wall at least partially to close one end of said combustion cup, and a first flange which extends outwardly from an end of said first side wall opposite from said one end, said first side wall including surface means for defining a plurality of openings through which gas from said gas generating material flows outwardly through said first side wall, a one-piece cover secured to said first flange and extending inward from said first flange and from an end of said first side wall opposite from said one end, said first side wall, first end wall and cover cooperating at least partially to define a chamber in which said gas generating material is disposed, and a one-piece diffuser cup at least partially enclosing said combustion cup, said one-piece diffuser cup including an axially extending second side wall which extends around said first side wall, a second end wall which extends inwardly from one end of said second side wall into overlapping engagement with said first end wall, and a second flange which extends outwardly from an end of said second side wall opposite from said one end, said second flange being secured to said first flange, said second side wall having a plurality of openings through which gas from said gas generating material flows outwardly to the occupant restraint.

2. An apparatus as set forth in claim 1 wherein the thickness of said first and second side walls decreases along the axial extent of said first and second side walls from adjacent said first and second flanges to said first and second end walls.

3. An apparatus as set forth in claim 1 wherein the openings in said first side wall are offset from the openings in said second side wall in an axial direction along said first and second side walls.

4. An apparatus as set forth in claim 1 wherein said cover and said first flange are disposed in overlapping engagement with each other at a location outwardly from said first side wall and inwardly from said second side wall.

5. An apparatus as set forth in claim 1 wherein said first and second side walls have a cylindrical configuration and said first and second flanges extend radially outwardly from said first and second side walls.

6. An apparatus as set forth in claim 5 wherein said second side wall has an axial extent which is at least substantially as great as the axial extent of said first side wall.

7. An apparatus as set forth in claim 1 further including initiator means for igniting said gas generating material, said initiator means extending through a central opening in said cover toward said first end wall, said first end wall being imperforate and extending across said initiator means.

8. An apparatus for use in inflating a vehicle occupant restraint, said apparatus comprising:

a one-piece combustion cup for holding a gas generating material, said one-piece combustion cup including a first cylindrical axially extending side wall and a first circular end wall which extends radially inwardly from one end of said first side wall and which cooperates with said first side wall at least partially to define a chamber for holding the gas generating material, said first side wall including surface means for defining a plurality of openings through which gas from the gas generating material flows;

a one-piece diffuser cup at least partially enclosing said combustion cup, said one-piece diffuser cup including a second cylindrical axially extending side wall which extends around said first side wall and a second circular end wall which extends radially inwardly from one end of said second side wall and which cooperates with said second side wall at least partially to define a diffuser chamber which extends around said first side wall, said second side wall having a plurality of openings through which gas flows from the diffuser chamber, said first and second end walls having radially extending surfaces disposed in overlapping engagement; and circular weld means for interconnecting said first and second end walls at an area of overlapping engagement of said first and second end walls, said second end wall including surface means for defining an opening in said radially extending surface of said second end wall through which a portion of said first end wall is exposed, said weld means being disposed adjacent to the opening in said second end wall and to said overlapping radially extending surfaces.

9. An apparatus as set forth in claim 8 wherein said first end wall is imperforate and extends transversely of a central axis of said combustion cup.

10. An apparatus as set forth in claim 8 further including an annular filter disposed in said diffuser chamber and circumscribing said first side wall to remove material from gas which flows through the diffuser chamber.

11. An apparatus for inflating a vehicle occupant restraint, said apparatus comprising:

an inflator housing; and gas generating material disposed in said inflator housing for supplying gas to inflate the occupant restraint, said inflator housing including, a one-piece combustion cup in which said gas generating material is disposed, said one-piece combustion cup including a first axially extending side wall which also extends around said gas generating material, a first end wall which extends inwardly from one end of said first side wall at least partially to close one end of said combustion cup, and a first flange which extends outwardly from an end of said first side wall opposite from said one end, said first side wall including surface means for defining a plurality of openings through which gas from said gas generating material flows outwardly through said first side wall, a one-piece cover which extends inwardly from an end of said first side wall opposite from said one end, said first side wall, first end wall and cover cooperating at least partially to define a chamber in which said gas generating material is disposed, and a one-piece diffuser cup at least partially enclosing said combustion cup, said one-piece diffuser cup including an axially extending second side wall which extends around said first side wall, a second end wall which extends inwardly from one end of said second side wall into overlapping engagement with said first end wall, and a second flange which extends outwardly from an end of said second side wall opposite from said one end, said second side wall having a plurality of openings through which gas from said gas generating material flows outwardly to the occupant restraint, said first and second flanges being disposed in overlapping engagement with each other at a location outwardly from said second side wall.

12. An apparatus for inflating a vehicle occupant restraint, said apparatus comprising:

a metal inflator housing; and gas generating material disposed in said inflator housing for supplying gas to inflate the occupant restraint, said inflator housing including an axially extending housing side wall which extends around said gas generating material and an end wall which is formed as one piece of metal with said housing side wall and which extends inwardly from one end of said housing side wall, said housing side wall having an average yield strength which is at least 1.2 times the average yield strength of said end wall.

13. An apparatus as set forth in claim 12 wherein said housing side wall has been strain hardened to have a hardness which varies along the axial extent of said side wall between an area of a minimum hardness which is at least as great as the average hardness of said end wall and an area of a maximum hardness which is at least 1.2 times the average hardness of said end wall.

14. An apparatus as set forth in claim 13 wherein the average thickness of said side wall varies along the axial extent of said side wall between an area of a minimum thickness and an area of a maximum thickness, the area of said side wall having the maximum hardness being located at the area of said side wall having the maximum thickness.

15. An apparatus as set forth in claim 12 wherein said housing side wall has an axial extent which is at least 20 times the thickness of said end wall.

16. An apparatus as set forth in claim 12 wherein the material of said housing side wall has an average yield strength in excess of 120,000 pounds per square inch and the material of said end wall has an average yield strength of less than 100,000 pounds per square inch.

17. An apparatus as set forth in claim 12 wherein said side wall has a cylindrical configuration, said inflator housing including an axially extending outer side wall which has a cylindrical configuration and which extends around said housing side wall and a second end wall which is formed as one piece of metal with said outer side wall and which extends inwardly from one end of said outer side wall, said second end wall being disposed in abutting engagement with the on piece of metal which forms said housing side wall and end wall, said outer side wall having a yield strength which is greater than the yield strength of said second end wall.

18. An apparatus as set forth in claim 17 wherein said outer side wall is strain hardened to have a hardness which is greater than the hardness of said second end wall.

19. An apparatus as set forth in claim 12 wherein said housing side wall has a cylindrical configuration, said inflator housing including an axially extending inner side wall which has a cylindrical configuration and which is circumscribed by said housing side wall and a second end wall which is formed as one piece with said inner side wall and which extends inwardly from one end of said inner side wall, said second end wall being disposed in abutting engagement with the one piece of metal which forms said housing side wall and end wall, said inner side wall having a yield strength which is greater than the yield strength of said second end wall.

20. An apparatus as set forth in claim 12 wherein said inflator housing further includes a housing flange which is formed as one piece with said housing side wall and extends outwardly from an end of said housing side wall opposite from said end wall, said housing side wall including a plurality of openings through which gas from said gas generating material flows outwardly, a one-piece cover which extends inwardly from an end of said housing side wall opposite from said end wall at a location adjacent to an intersection between said housing flange and said housing side wall and which extends inwardly from said housing said wall at least partially to define a chamber in which said gas generating material is disposed.

21. An apparatus as set forth in claim 20 wherein said inflator housing further includes an axially extending outer side wall which extends around said housing side wall and which extends past the openings in said housing side wall, a second end wall which is formed as one piece with said outer side wall and which extends inwardly from one end of said outer side wall into overlapping engagement with said end wall which is formed as one piece with said housing side wall, and a second flange which is formed as one piece with said outer side wall and which extends outwardly from an end of said outer side wall opposite from said one end, said outer side wall including surface means for defining a plurality of openings through which gas from said gas generating material flows outwardly to the occupant restraint.

22. An apparatus as set forth in claim 21 wherein said outer side wall has a yield strength which is greater than the yield strength of said second end wall.

23. An apparatus as set forth in claim 22 wherein said housing and second flanges are disposed in abutting engagement with each other at a location outwardly of said outer side wall.

24. An apparatus as set forth in claim 23 wherein said cover and said housing flange are disposed in abutting engagement with each other at a location outwardly of said housing side wall and inwardly from said outer side wall.

25. An apparatus as set forth in claim 24 wherein said outer side wall has an axial extent which is at least substantially as great as the axial extent of said housing side wall.

26. A method of inflating a vehicle occupant restraint, said method comprising the steps of:

igniting gas generating material in a combustion chamber formed by an inner side wall and inner end walls to generate fluid pressure in the combustion chamber;

conducting a flow of gas from the combustion chamber through openings in the inner side wall to a diffuser chamber which extends around the inner side wall and which is at least partially formed by an outer side wall and outer end walls;

conducting a flow of gas from the diffuser chamber through openings in the outer side wall to the occupant restraint;

exceeding the yield strength of the inner end walls under the influence of fluid pressure in the combustion chamber, during combustion of the gas generating material; and plastically deforming the inner end walls axially outwardly, during combustion of the gas generating material, without significant plastic deformation of the inner side wall radially outwardly from the position of the inner side wall prior to igniting the gas generating material.

27. A method as set forth in claim 26 further including the step of deflecting a portion of the inner side wall radially inwardly from the position of the inner side wall prior to igniting the gas generating material, the deflecting of a portion of the inner side wall being caused by a force transmitted from at least one of the inner end walls to the inner side wall during plastic deformation of the inner end walls.

28. A method as set forth in claim 26 further including the step of transmitting force from one of the inner end walls to the outer side wall during plastic deformation of said one inner end wall.

29. A method as set forth in claim 26 wherein said step of plastically deforming the inner end walls includes plastically moving a portion of one of the inner end walls outwardly through an opening formed in one of the outer end walls.

30. A method as set forth in claim 26 wherein said step of plastically deforming the inner end walls includes plastically deforming one of the inner end walls to a greater extent than the other inner end wall.

31. An apparatus for inflating a vehicle occupant restraint, said apparatus comprising:
 an inflator housing; and
 gas generating material disposed in said inflator housing for supplying gas to inflate the occupant restraint,
 said inflator housing including,
 a cylindrical inner side wall which extends around said gas generating material, a first end wall which is formed as one piece with said inner side wall and which extends inwardly from one end of said inner side wall, a first annular flange which is formed as one piece with said inner side wall and which extends radially outwardly from said inner side wall and which has upper and lower major side surfaces disposed in planes which extend generally perpendicular to a central axis of said cylindrical inner side wall,
 a cover which extends inwardly from an end of said inner side wall opposite from said one end and which is disposed in abutting engagement with the lower major side surface of said first flange,
 said inner side wall, first end wall and cover cooperating at least partially to define an inner chamber in which the gas generating material is disposed,
 said inner side wall including a plurality of openings through which gas can flow from the inner chamber,
 a cylindrical outer side wall which extends around and which is spaced from said inner side wall, a second end wall which is formed as one piece with said outer side wall and which extends radially inwardly from said outer side wall, and a second annular flange which is formed as one piece with said outer side wall and which extends radially outwardly from said outer side wall and which has a lower major side surface disposed in a plane which extends generally perpendicular to a central axis of said cylindrical outer side wall,
 said lower major side surface of said second flange being disposed in abutting engagement with the upper major side surface of said first flange,
 said outer side wall, second end wall and first flange cooperating at least partially to define an outer chamber which extends around said inner side wall, said outer side wall including a plurality of openings through which gas can flow from the outer chamber.

32. An apparatus as set forth in claim 31 wherein said second end wall has an annular configuration and a major side surface disposed in abutting engagement with said first end wall, a portion of said first end wall being exposed through an opening in said second end wall.

33. An apparatus as set forth in claim 31 wherein said first end wall is imperforate and extends transversely of the central axis of said cylindrical inner side wall.

34. An apparatus as set forth in claim 31 wherein said apparatus further includes initiator means at least partially disposed in the inner chamber for igniting said gas generating material to establish a flow of gas through the openings in said inner side wall to the outer chamber and from the outer chamber through the openings in said outer side wall.

35. An apparatus as set forth in claim 34 wherein said first end wall is imperforate and extends transversely of the central axis of said inner side wall.

36. An apparatus as set forth in claim 31 wherein said inner side wall has a yield strength which is greater than the yield strength of said first end wall and said cover.

37. An apparatus as set forth in claim 31 further including a first annular weld interconnecting said cover and said first flange and a second annular weld interconnecting said first and second flanges.

38. An apparatus for inflating a vehicle occupant restraint, said apparatus comprising an inflator housing, gas generating material disposed in said inflator housing for supplying gas to inflate the occupant restraint, and initiator means for igniting said gas generating material, said inflator housing including a cylindrical inner side wall which extends around said gas generating material, a pair of inner end walls which extend inwardly from opposite ends of said inner side wall, a cylindrical outer side wall which extends around and is spaced from said inner side wall, a pair of outer end walls which extend inwardly from opposite ends of said outer side wall, said outer side wall, outer end walls and inner side wall cooperating at least partially to define a diffusor chamber, said inner end walls yielding and plastically deforming axially outwardly without significant plastic deformation of said inner side wall radially outwardly from the position of said inner side wall prior to igniting of the gas generating material.

39. An apparatus as set forth in claim 38 wherein at least a portion of said inner side wall is deflectable radially inwardly by a force transmitted from at least one of said inner end walls during plastic deformation of said inner end walls.

40. An apparatus as set forth in claim 39 wherein at least one of said outer end walls transmits force to said outer side wall from said one inner end wall during plastic deformation of said inner end walls axially outwardly.

41. An apparatus for inflating a vehicle occupant restraint, said apparatus comprising:
 an inflator housing; and
 gas generating material disposed in said inflator housing for supplying gas to inflate the occupant restraint,
 said inflator housing including,
 a one-piece combustion cup in which said gas generating material is disposed, said one-piece combustion cup including a first axially extending side wall which also extends around said gas generating material, a first end wall which extends inwardly from one end of said first side wall at least partially to close one end of said combustion cup, and a first flange which extends outwardly from an end of said first side wall opposite from said one end, said first side wall including surface means for defining a plurality of openings through which gas from said gas generating material flows outwardly through said first side wall, a one-piece cover which extends inwardly from an end of said first side wall opposite from said one end, said first side wall, first end wall and cover cooperating at least partially to define a chamber in which said gas generating material is disposed, and a one-piece diffuser cup at least partially enclosing said combustion cup, said one-piece diffuser cup including an axially extending second side wall which extends around said first side wall, a second end wall which extends inwardly from one end of said second side wall into overlapping engagement with said first end wall, and a second flange which extends outwardly from an end of said second side wall opposite from said one end, said second side wall having a plurality of openings through which gas from said gas generating material flows outwardly to the occupant restraint, said first and second side walls having a cylindrical configuration and said first and second flanges extending radially outwardly from said first and second side walls, said second side wall having an axial extent which is at least substantially as great as the axial extent of said first side wall, said cover extending across the end of said first side wall opposite from said one end into abutting engagement with said first flange and said first flange extending across the end of said second side wall opposite from said one end into abutting engagement with said second flange.

42. An apparatus as set forth in claim 41 wherein the openings in said first side wall are disposed adjacent to said first flange and the openings in said second side wall are disposed adjacent to said second end wall.

43. An apparatus for inflating a vehicle occupant restraint, said apparatus comprising:

an inflator housing; and gas generating material disposed in said inflator housing for supplying gas to inflate the occupant restraint, said inflator housing including, a one-piece combustion cup in which said gas generating material is disposed, said one-piece combustion cup including a first axially extending side wall which also extends around said gas generating material, a first end wall which extends inwardly from one end of said first side wall at least partially to close one end of said combustion cup, and a first flange which extends outwardly from an end of said first side wall opposite from said one end, said first side wall including surface means for defining a plurality of openings through which gas from said gas generating material flows outwardly through said first side wall, a one-piece cover which extends inwardly from an end of said first side wall opposite from said one end, said first side wall, first end wall and cover cooperating at least partially to define a chamber in which said gas generating material is disposed, and a one-piece diffuser cup at least partially enclosing said combustion cup, said one-piece diffuser cup including an axially extending second side wall which extends around said first side wall, a second end wall which extends inwardly from one end of said second side wall into overlapping engagement with said first end wall, and a second flange which extends outwardly from an end of said second side wall opposite from said one end, said second side wall having a plurality of openings through which gas from said gas generating material flows outwardly to the occupant restraint, the average yield strength of said first and second side walls being at least 20% greater than the average yield strength of said first and second end walls.

44. An apparatus for inflating a vehicle occupant restraint, said apparatus comprising:

an inflator housing;

gas generating material disposed in said inflator housing for supplying gas to inflate the occupant restraint; and initiator means for initiating a flow of gas from said gas generating material, said inflator housing including a combustion cup formed from a single piece of sheet metal, a diffuser cup formed from a single piece of sheet metal, said diffuser cup being connected with and extending around said combustion cup to form a diffuser chamber, and a cover formed from a single piece of sheet metal and connected with said combustion cup, said cover and combustion cup cooperating to define a combustion chamber in which said initiator means and gas generating material are disposed, said combustion cup having an imperforate end wall which extends transversely of central axes of said combustion and diffuser cups, said combustion cup having an annular flange which extends outwardly from an end of said combustion cup opposite from said end wall, said diffuser cup being connected to said flange.

45. An apparatus as set forth in claim 44 wherein said cover is connected to said flange which extends outwardly from one end of said combustion cup.

46. An apparatus for use in inflating a vehicle occupant restraint, said apparatus comprising:

a one-piece combustion cup for holding a gas generating material, said one-piece combustion cup including a first cylindrical axially extending side wall and a first circular end wall which extends radially inwardly from one end of said first side wall and which cooperates with said first side wall at least partially to define a chamber for holding the gas generating material, said first side wall including surface means for defining a plurality of openings through which gas from the gas generating material flows;

a one-piece diffuser cup at least partially enclosing said combustion cup, said one-piece diffuser cup including a second cylindrical axially extending side wall which extends around said first side wall and a second circular end wall which extends radially inwardly from one end of said second side wall and which cooperates with said second side wall at least partially to define a diffuser chamber which extends around said first side wall, said second side wall having a plurality of openings through which gas flows from the diffuser chamber, said second end wall being disposed in overlapping engagement with said first end wall; and circular weld means for interconnecting said first and second end walls at an area of overlapping engagement of said first and second end walls, said one-piece combustion cup further including a first annular flange which extends radially outwardly from an end of said first side wall opposite from said one end, said one-piece diffuser cup further including a second annular flange which extends radially outwardly from an end of said second side wall opposite from said one end, said first and second flanges being disposed in overlapping engagement, and second circular weld means for interconnecting said first and second flanges at an area of overlapping engagement of said first and second flanges.

* * * * *

UNITED STATES PATENT AND TRADEMARK OFFICE
CERTIFICATE OF CORRECTION

PATENT NO. : 5,106,119
DATED : April 21, 1992
INVENTOR(S) : Timothy A. Swann and John P. O'Loughlin It is certified that error appears in the above-identified patent and that said Letters Patent is hereby corrected as shown below:

Column 19, Line 42, Claim 17, change "on" to --one--.

Column 20, Line 5, Claim 20, change "said" (second occurance) to --side--.

Signed and Sealed this

Eighth Day of June, 1993

Attest:

MICHAEL K. KIRK

*Attesting Officer*     Acting Commissioner of Patents and Trademarks